United States Patent
Tsukamoto et al.

(10) Patent No.: US 10,561,914 B2
(45) Date of Patent: *Feb. 18, 2020

(54) BASEBALL OR SOFTBALL BAT WITH MODIFIED RESTITUTION CHARACTERISTICS

(71) Applicant: MIZUNO CORPORATION, Osaka (JP)

(72) Inventors: Michiharu Tsukamoto, Osaka (JP); Yohei Yamashita, Osaka (JP); Toshiaki Kida, Osaka (JP); Kazuhiko Shindome, Hashima (JP); Kohei Kikuchi, Gifu (JP)

(73) Assignee: MIZUNO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,339

(22) Filed: Nov. 22, 2017

(65) Prior Publication Data
US 2018/0093148 A1    Apr. 5, 2018

Related U.S. Application Data

(63) Continuation-in-part of application No. 14/324,108, filed on Jul. 4, 2014, which is a continuation-in-part
(Continued)

(51) Int. Cl.
*A63B 59/54*    (2015.01)
*A63B 59/50*    (2015.01)
(Continued)

(52) U.S. Cl.
CPC .............. *A63B 59/50* (2015.10); *A63B 60/00* (2015.10); *A63B 59/51* (2015.10); *A63B 59/54* (2015.10);
(Continued)

(58) Field of Classification Search
CPC .......... A63B 2102/18; A63B 2102/182; A63B 59/50–58; A63B 2059/581
(Continued)

(56) References Cited

U.S. PATENT DOCUMENTS 3,801,098 A    4/1974  Gildemeister
5,511,777 A    4/1996  McNeely
(Continued)

FOREIGN PATENT DOCUMENTS

JP    2002126144 A    5/2002

OTHER PUBLICATIONS

International Search Report and Written Opinion of the International Searching Authority for related International Patent Application No. PCT/US2012/020537 dated May 1, 2012.

*Primary Examiner* — Mark S Graham
(74) *Attorney, Agent, or Firm* — Troutman Sanders LLP; Daniel Sharpe; Micah Hensley

(57) ABSTRACT

A softball or baseball bat with modified restitution characteristic is provided. The bat can comprise a substantially rigid core coupled with a single or multi-piece sleeve. The core can comprise a tip end, a barrel portion, a handle taper, and a handle. A sleeve assembly can be disposed over the barrel portion, and the sleeve assembly can comprise one or more materials capable of impact absorption. The sleeve assembly can include a ring portion positioned about a circumference of the barrel portion, an outer sleeve, and an inner sleeve disposed between the outer sleeve and the barrel portion.

15 Claims, 18 Drawing Sheets

Related U.S. Application Data of application No. 13/345,004, filed on Jan. 6, 2012, now abandoned.

(60) Provisional application No. 61/430,367, filed on Jan. 6, 2011.

(51) Int. Cl.
*A63B 60/00* (2015.01)
*A63B 59/51* (2015.01)
*A63B 102/18* (2015.01)

(52) U.S. Cl.
CPC ..... *A63B 2102/18* (2015.10); *A63B 2102/182* (2015.10)

(58) Field of Classification Search
USPC .................. 473/457, 519, 520, 564–568
See application file for complete search history.

(56) References Cited

U.S. PATENT DOCUMENTS

| | | | |
|---|---|---|---|
| 6,048,283 A | 4/2000 | Albarelli, Jr. | |
| 6,398,675 B1 | 6/2002 | Eggiman et al. | |
| 6,432,007 B1 | 8/2002 | Filice et al. | |
| 6,869,373 B1 | 3/2005 | Byrne et al. | |
| 6,872,156 B2 | 3/2005 | Ogawa et al. | |
| 7,014,580 B2 | 3/2006 | Forsythe et al. | |
| 7,033,291 B1 | 4/2006 | Meeker | |
| 7,128,670 B2 | 10/2006 | Souders et al. | |
| 7,175,552 B2 | 2/2007 | Fritzke et al. | |
| 7,344,461 B2 | 3/2008 | Van Nguyen | |
| 7,361,107 B2 | 4/2008 | Giannetti et al. | |
| 7,748,115 B2 | 7/2010 | Vasudivan et al. | |
| 7,749,115 B1 | 7/2010 | Cruz et al. | |
| 7,985,149 B2 | 7/2011 | Watari et al. | |
| 8,602,924 B2 | 12/2013 | Shindome et al. | |
| 2003/0004020 A1 | 1/2003 | Ogawa et al. | |
| 2004/0053716 A1 | 3/2004 | Wu | |
| 2006/0258490 A1 | 11/2006 | Fitzgerald et al. | |
| 2007/0219027 A1 | 9/2007 | Chong | |
| 2008/0070726 A1 | 3/2008 | Watari et al. | |
| 2008/0234075 A1 | 9/2008 | Lancisi | |
| 2009/0143176 A1 | 6/2009 | Burger | |
| 2009/0215560 A1 | 8/2009 | McNamee et al. | |
| 2009/0264230 A1 | 10/2009 | Thouin | |
| 2009/0280934 A1 | 11/2009 | Watari et al. | |
| 2009/0280935 A1 | 11/2009 | Watari et al. | |
| 2011/0195808 A1 | 8/2011 | Chauvin | |
| 2011/0281674 A1 | 11/2011 | Shindome et al. | |
| 2011/0287875 A1* | 11/2011 | Vander Pol | A63B 60/00 473/519 |
| 2012/0108371 A1 | 5/2012 | Epling et al. | |
| 2012/0142461 A1* | 6/2012 | Chuang | A63B 59/06 473/567 |
| 2012/0178558 A1 | 7/2012 | Tsukamoto et al. | |

\* cited by examiner

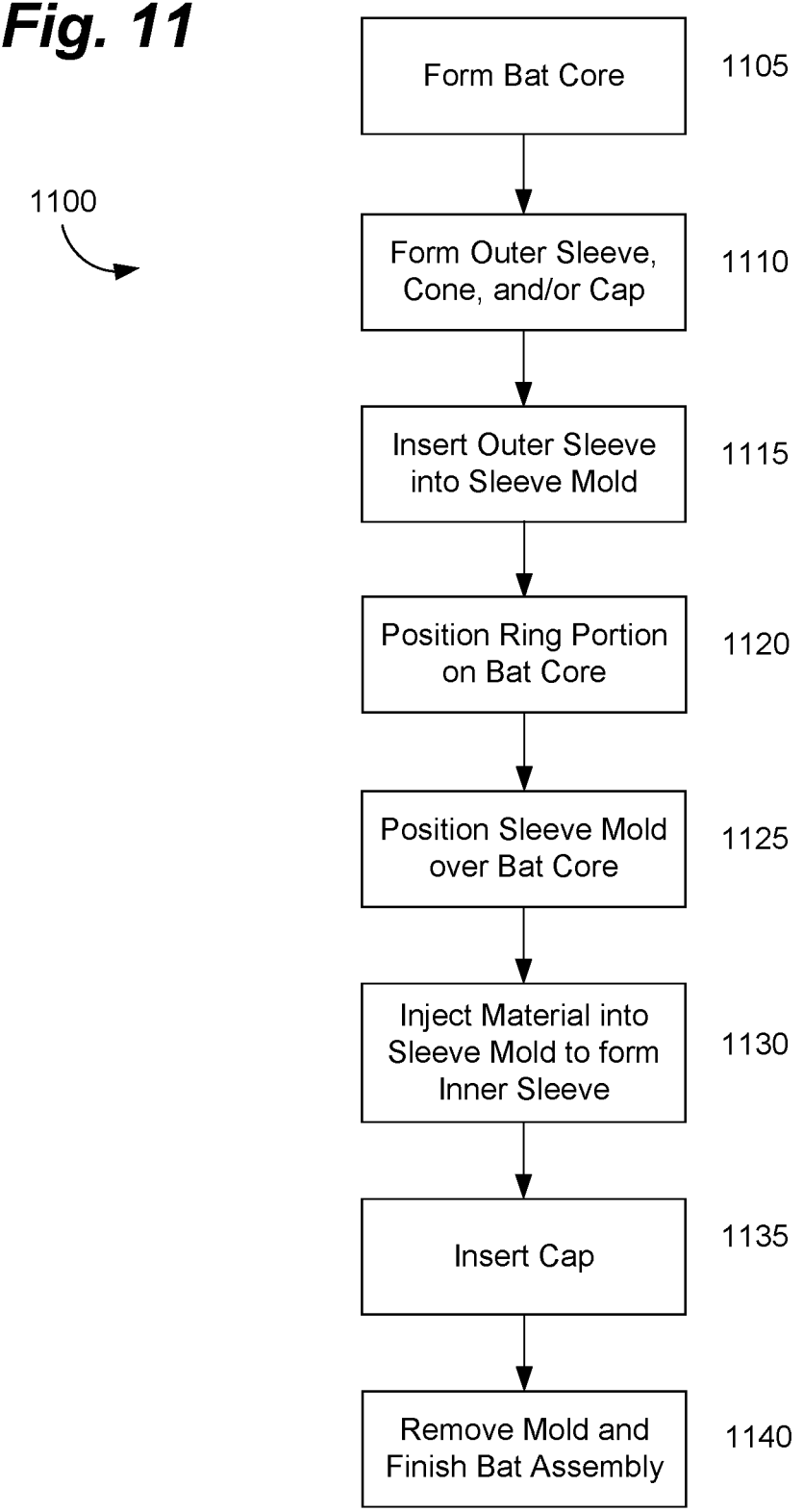

BASEBALL OR SOFTBALL BAT WITH MODIFIED RESTITUTION CHARACTERISTICS

CROSS-REFERENCE TO RELATED APPLICATIONS AND PRIORITY CLAIM

This application is a continuation-in-part of, and claims priority under 35 U.S.C. § 120 to, U.S. patent application Ser. No. 14/324,108, of the same title, filed Jul. 4, 2014, which is a continuation-in-part of, and claims priority under 35 U.S.C. § 120 to, U.S. patent application Ser. No. 13/345,004, of the same title, filed Jan. 6, 2012, which claims the benefit, under 35 U.S.C. § 119(e), to U.S. Provisional Patent Application No. 61/430,367, filed Jan. 6, 2011, the entire contents and substance of both applications is incorporated herein by reference in its entirety as if fully set forth below.

BACKGROUND OF THE INVENTION

1. Field of the Invention

The present invention relates generally to bats for use in baseball and softball and specifically to bats with modified restitution characteristics to provide increased performance at various locations along the bats while complying with maximum performance standards imposed by various sanctioning bodies.

2. Background of Related Art

Conventionally, bat manufacturers have endeavored to improve the performance of bats. In the case of a bat, improved performance can come in the form of, among other things, improved accuracy, reduced vibration, or increased coefficient of restitution. The latter, coefficient of restitution, relates to the power the bat imparts to the ball. In other words, the higher the coefficient of restitution of a bat, the faster the ball will rebound off the bat relative to the pitch speed.

Conventionally, bats were made out of hardwoods such as, for example, maple, birch, and ash. These woods provide good durability and reasonable cost of manufacture. In this case, however, the restitution characteristics of the bat are largely dictated (and limited) by the wood chosen. This limitation of the restitution, and thus power, of the bat, along with a certain amount of nostalgia, explains the use of wooden bats in Major League Baseball. It is thought that the extreme amount of energy major league players could impart to the ball, if armed with the more powerful aluminum or composite bats, would pose a danger to themselves, other players, and fans.

Until recently, the increased power provided by non-wooden bats was not thought to be an issue at lower levels, such as collegiate baseball and softball. As a result, aluminum and composite bats were used an unregulated in NCAA sports until approximately 1998. As a result, the materials and designs were chosen to maximize the restitution of the bat. In other words, the bats were designed to increase the velocity of the ball as it left the bat, or to be "hotter."

As shown in FIG. 1, an example of a bat design intended to maximize restitution is shown in U.S. Pat. No. 6,872,156 to Ogawa et al. This bat 100 comprises an aluminum core 105 with tapers 110a, 110b at both ends of the barrel. The tapered portion is then wrapped with a thermal polyurethane (TPU) sheet 115 to improve the restitution properties (i.e., the power) of the bat. Unfortunately, the double taper 110a, 110b of this bat proves to be difficult using conventional aluminum manufacturing techniques (i.e., this shape cannot be swaged or extruded). In addition, the dual taper 110a, 110b requires that the TPU sleeve 115 be molded or rolled onto the bat using hot forming techniques, producing a seam 120. As a result, it is difficult to maintain the density of the material 115 during application and the seam 120 presents a possible failure point that reduces durability.

After a marked increase in hitting statistics and player injuries, however, in 1998 the NCAA began to look into regulating the bats. Initially, the bats were regulated based on the return speed of a pitch based on the swing speed of the bat. This measurement was later found to be insufficient because, unlike solid wooden bats, the balance point of hollow non-wooden bats can be manipulated to increase swingspeed. The closer the balance point of the bat is to the handle, for example, the faster a player can swing the bat, which is directly related to the ball speed coming off the bat.

Since 1998, continual refinement of the NCAA standard has resulted in a rule that governs many physical aspects of bats for use in NCAA sports. The size and weight of the bat is regulated, for example, along with the moment of inertia and the Baseball Coefficient of Restitution (BBCOR). Bats must be tested in NCAA laboratories for initial certification and may be subjected to random field-testing. The latter to ensure that certain bats, such as composite bats (that tend to get "hotter" with use), remain within guidelines. Other domestic and foreign sanctioning bodies have, or are in the process of, imposing similar performance standards.

What is needed, therefore, is a bat designed, not to maximize absolute performance, but to maximize performance within a given set of guidelines and to maximize the portion of the bat that can provide maximum performance within a given set of guidelines. The bat should be tunable to meet different standards and inexpensive to manufacture. It is to such a bat that embodiments of the present invention are primarily directed.

SUMMARY OF THE INVENTION

Embodiments of the present invention relate to a baseball or softball bat core with an exterior resilient sleeve. The bat core can comprise a variety of materials including, but not limited to, aluminum, fiberglass, and carbon fiber. In some embodiments, the bat core can comprise a tapered, stepless barrel with no discontinuities along the length of the barrel. The resilient sleeve can be placed onto the bat core from the handle end or the tip end and can be affixed to the barrel by injecting a material therebetween to form an inner sleeve. In this manner, no steps or shoulders are required on the barrel.

According to some embodiments, a batting system, such as a batting system for baseball or softball, can comprise a substantially stepless, rigid shell. The rigid shell can include a tip portion, a barrel portion, a handle taper, and a handle portion. The barrel portion and the handle portion can be substantially cylindrical in shape, and the handle taper can connect the barrel portion and the handle portion. The batting system can also include a ring portion disposed about a circumference of the barrel portion and an exterior sleeve disposed in an overlying manner to the barrel portion. The exterior sleeve can comprise a self-supporting, substantially cylindrical sleeve portion disposed proximate the barrel portion that is press-fit to abut a discrete conical portion disposed proximate the handle taper. The batting system can also include an interior sleeve that can be disposed between the rigid shell and the exterior sleeve. The interior sleeve can directly abut both the rigid shell and the rigid, substantially cylindrical sleeve portion, and the interior sleeve can extend from the conical portion to the tip portion.

In some embodiments, the interior sleeve can comprise a first material having a first density and a first chemical composition, and the ring portion can comprise a second material having a second density and a second chemical composition.

In some embodiments, the first density can be different from the second density.

In some embodiments, the first chemical composition can be different from the second chemical composition.

In some embodiments, the first material can have a first coefficient of restitution, the second material can have a second coefficient of restitution, and the second coefficient of restitution can be less than the first coefficient of restitution.

In some embodiments, the ring portion can be disposed at a position along the barrel portion that corresponds to a traditional sweet spot of the batting system.

In some embodiments, the ring portion can be centered at a location approximately 6 inches from an end of the batting system proximate the tip portion.

In some embodiments, the batting system can have an effective sweet spot, and the effective sweet spot can be larger than the traditional sweet spot.

In some embodiments, the ring portion can be approximately 3 inches wide.

According to some embodiments, a batting system, such as a batting system for baseball or softball, can comprise a substantially stepless, rigid shell. The rigid shell can comprise a cap end, a barrel portion, a handle taper, and a handle portion. The barrel portion and the handle portion can be substantially cylindrical in shape, and the handle taper can connect the barrel portion and the handle portion. The batting system can also include a sleeve assembly disposed in an overlying manner to the barrel portion, and the sleeve assembly can include an outer sleeve concentrically disposed about the barrel portion. The outer sleeve can be self-supporting and substantially cylindrical and can have a first end proximate the tip portion and a second end proximate the handle taper. The sleeve assembly can also include a conical portion abutting at least a portion of the handle taper and at least a portion of the second end of the outer sleeve, a ring portion disposed about a circumference of the barrel portion such that the ring portion is abutting the barrel portion, and an inner sleeve disposed between at least some of the sleeve portion and at least some of the rigid shell In some embodiments, the inner sleeve can comprise an injectable material injected between at least some of the sleeve portion and at least some of the rigid shell.

In some embodiments, the injectable material can comprise polyurethane foam.

In some embodiments, at least some of the inner sleeve can be disposed between the ring portion and the outer sleeve.

In some embodiments, the batting system can further comprise a cap disposed proximate the cap end of the rigid shell, and the cap can be affixed to at least one of the rigid shell, the inner sleeve, and the outer sleeve.

In some embodiments, at least one of the cap, the inner sleeve, the ring portion, and the conical portion can prevent the outer sleeve from contacting the rigid shell.

According to some embodiments, a method of manufacturing a baseball or softball bat can include forming a substantially stepless, rigid core that comprises a tip portion, a barrel portion, a handle taper, and a handle portion. The barrel portion and the handle portion can be substantially cylindrical in shape, and the handle taper can connect the barrel portion and the handle portion. The method can also include positioning a ring portion about a circumference of the barrel portion and forming an exterior sleeve. The exterior sleeve can be self-supporting and substantially cylindrical. The method can further include positioning the exterior sleeve coaxially over the substantially stepless, rigid core and injecting an injectable material between the exterior sleeve and the substantially stepless, rigid core and between the exterior sleeve and the ring portion such that an inner sleeve is formed.

In some embodiments, the ring portion can have a coefficient of restitution that is less than a coefficient of restitution of the injectable material.

In some embodiments, the injectable material can be polyurethane foam.

These and other objects, features and advantages of the present invention will become more apparent upon reading the following specification in conjunction with the accompanying drawing figures.

BRIEF DESCRIPTION OF THE FIGURES

FIG. 11 is a flowchart for a method of molding a multi-piece composite sleeve onto a bat with no flanges, in accordance with some embodiments of the present invention, in accordance with some embodiments of the present invention.

DETAILED DESCRIPTION OF THE INVENTION

Embodiments of the present invention relate to a baseball or softball bat, and more specifically a baseball or softball bat assembly comprising a substantially rigid core with an outer sleeve. In some embodiments, the core can comprise a substantially rigid material such as, for example, aluminum, fiberglass, or carbon fiber. The core can have a tip portion, a barrel taper, a barrel portion, and a handle taper. In some embodiments, the barrel taper can further comprise a lip or step.

The bat assembly can further comprise an exterior sleeve. The sleeve can comprise, for example, TPU, nylon, carbon fiber, or fiberglass. In some embodiments, the sleeve can be sized and shaped to be pressed, molded, or adhered to the barrel taper and barrel portion. The lip on the barrel taper can be, for example, a shoulder formed on the barrel portion to locate the sleeve. The materials, dimensions, and thicknesses, among other factors, of the sleeve and the core, can be manipulated to change the characteristics of the bat (e.g., BBCOR).

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention.

To simplify and clarify explanation, embodiments of the present invention are described below as a bat with an aluminum core or shell and a resilient, external TPU sleeve. Those skilled in the art will recognize, however, that the invention is not so limited. The shell of the bat, for example, can comprise other suitable materials such as, for example and not limitation, fiberglass, carbon fiber, or Kevlar®. Similarly, the sleeve could comprise, for example and not limitation, TPU, carbon fiber, or fiberglass. As will be discussed more fully below, the bat assembly can comprise multiple materials located at various positions along the bat, which may provide a larger "sweet spot" of the bat while continuing to comply with applicable regulations, such as BBCOR regulations.

Figure 1:
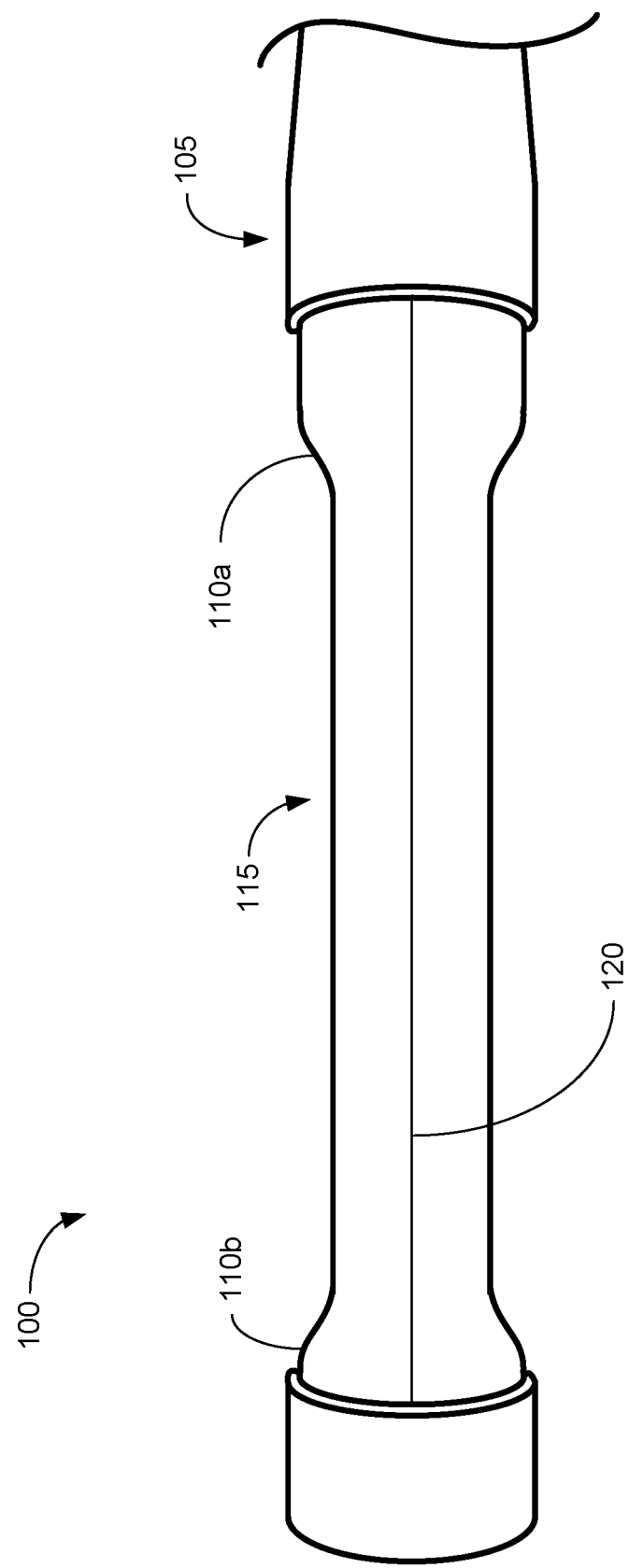
FIG. 1 depicts a prior art hybrid bat with dual flanges.

As described above, a problem with conventional hybrid bats is that they are difficult to manufacture. As shown in FIG. 1, conventional hybrid bats comprise a double barrel taper. He double barrel taper requires special forming processes and precludes the ability to use conventional metal forging and/or extruding techniques. In addition, the double taper requires that the sleeve component be seam welded or heat formed to the barrel. This is because the shape of the barrel prevents the sleeve from simply being pressed onto the barrel from one end or the other. In addition, previous bat designs have sought only to increase the power of the bat. The notion of creating ever "hotter" bats, however, is now at odds with rules imposed by a variety of sanctioning bodies.

What is needed therefore is a bat that provides superior ease of manufacture with adjustable performance characteristics. It is to such a bat that embodiments of the present invention are primarily directed.

Figure 2A:
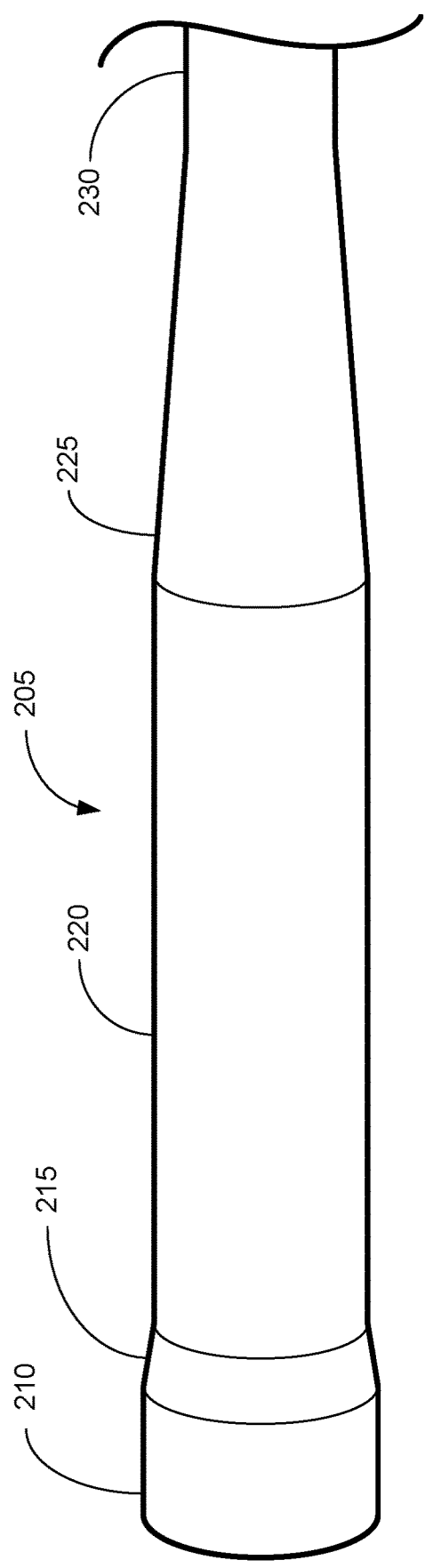
FIG. 2a depicts a bat core with a barrel taper, in accordance with some embodiments of the present invention.

As shown in FIG. 2a, embodiments of the present invention can comprise a batting system 200 comprising a rigid core 205. In a preferred embodiment, the core 205 can comprise aluminum, but other suitable materials such as, for example and not limitation, carbon fiber, fiberglass, and metal/plastic composites are contemplated. The core 205 can be formed using many suitable methods, including but not limited to, forging, CNC machining, blow-molding, and extrusion. The core 205 can comprise a tip portion 210, a barrel taper 215, a barrel portion 220, a handle taper 225, and a handle 230. As shown, in some embodiments, the tip portion 210 can comprise the portion of the bat 200 with the largest diameter. The tip portion 210 can also comprise a shoulder, or barrel taper 215, where the tip portion 210 transitions to the barrel portion 220. The barrel taper 215 can act as a stop for the resilient sleeve, discussed below.

Figure 2B:
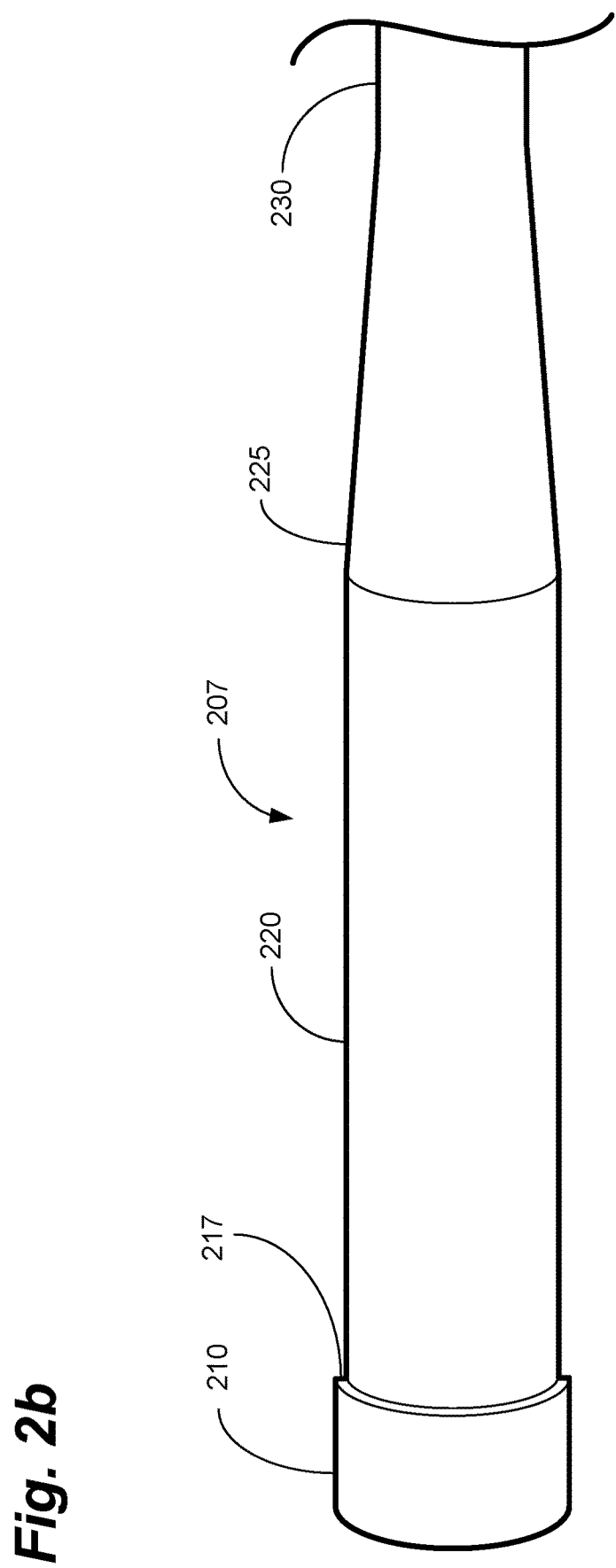
FIG. 2b depicts a bat core with a barrel step, in accordance with some embodiments of the present invention.

The core 205 can further comprise a barrel portion 220. The barrel taper 215 can transition between the larger diameter tip portion 210 and the smaller diameter barrel 220. In some embodiments, as shown in FIG. 2b, the core 207 may simply have a step 217 between the tip portion 210 and the barrel portion 220, precluding the need for the barrel taper 215. In a preferred embodiment, the barrel 220 can have substantially the same diameter from the end of the barrel taper 215, or step 217, to the beginning of the handle taper 225. The core 207 can further comprise a handle taper 225 and a handle 230. In some embodiments, the handle can comprise a knob located at the end of the handle 230 to prevent the bat from slipping out of the user's hand.

Figure 3A:
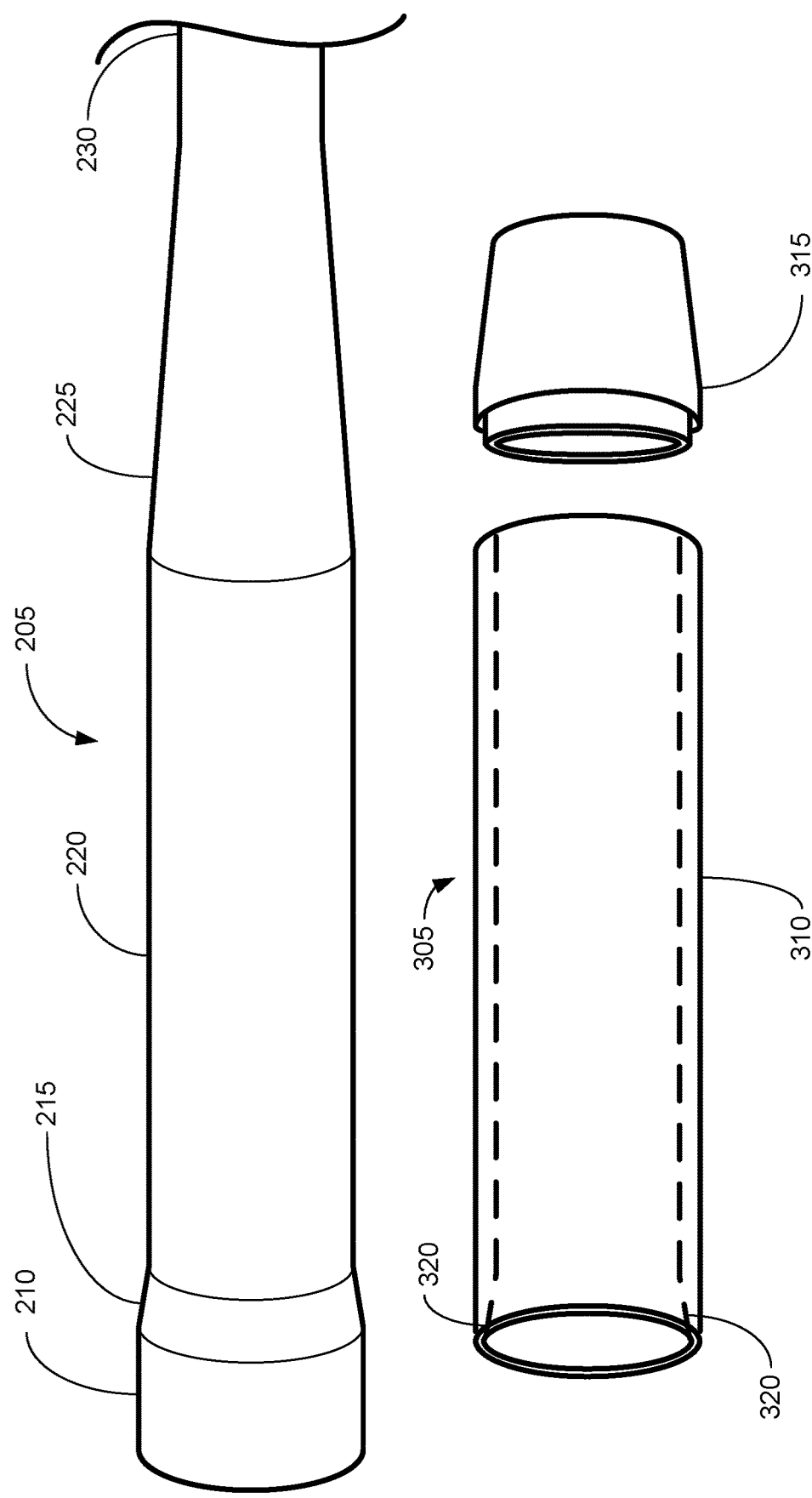
FIG. 3a depicts a two-piece sleeve and the tapered bat core of FIG. 2a, in accordance with some embodiments of the present invention.

As shown in FIG. 3a, the bat assembly 200 can further comprise an exterior sleeve assembly 305. In some embodiments, as shown, the sleeve assembly 305 can comprise a sleeve portion 310 and a tapered portion, or cone 315. The inside diameter of the sleeve 310 can be substantially the same as the outside diameter of the barrel 220. The outside diameter of the sleeve 310 can be tapered such that it is substantially the same diameter as the tip portion 210 on a first end, but tapers in the direction of the handle taper 225.

In some embodiments, the sleeve 310 can comprise a single or multi-layer composite material. The sleeve can comprise, for example, and not limitation, TPU, PU, carbon fiber, fiberglass, or combinations thereof. In a preferred embodiment, the sleeve comprises a TPU outer layer with a PU core. The TPU outer layer can be approximately 0.1-0.5 mm thick, while the PU inner layer can be approximately 4-10 mm thick. In a preferred embodiment, the TPU layer is approximately 0.3 mm, while the PU layer tapers from approximately 8 mm proximate the tip portion 210 to approximately 6 mm proximate the handle taper 225.

Of course, other sleeve combinations could be used that included more or less layers or different components to produce different bat characteristics. The sleeve 310 could comprise, for example, one or more layers of TPU, PU, carbon fiber, or fiberglass. In some embodiments, the layers of the sleeve could also be separated by one or more separation layers (i.e., layers intended to reduce the friction between layers of the sleeve 310). The separation layer could be, for example and not limitation, polypropylene to enable the multiple layers of the sleeve 310 to deform independently.

Figure 3B:
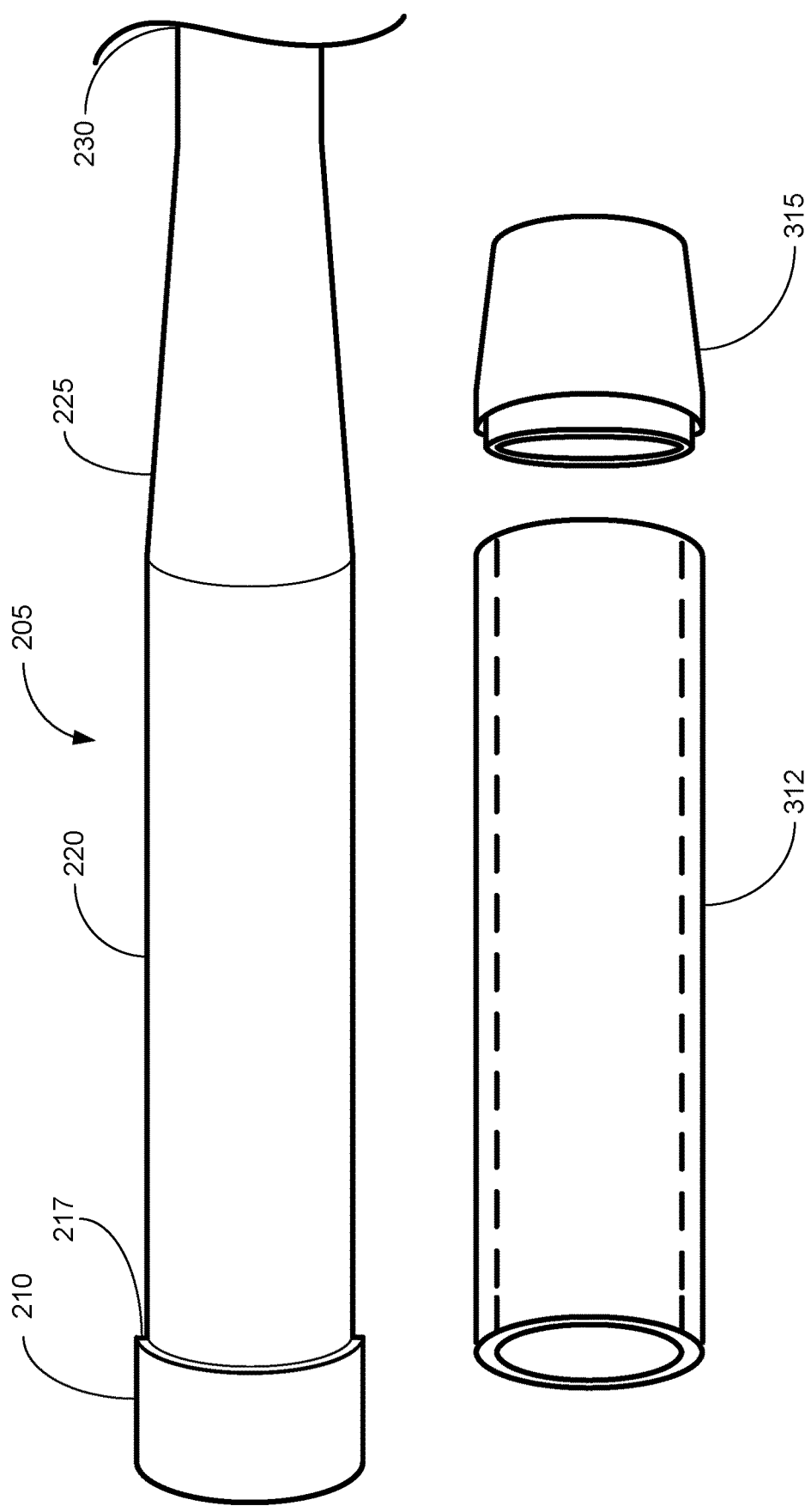
FIG. 3b depicts a two-piece sleeve and the stepped bat core of FIG. 2b, in accordance with some embodiments of the present invention.

In some embodiments, the inner diameter of the sleeve 310, shown in dashed lines, can comprise a taper 320 that substantially coincides with the barrel taper 215. In this manner, the sleeve 310 can be press fit onto the core 205. The barrel taper 215 can also act as a stop to ensure retention and proper location of the sleeve 310 on the core 205. In other embodiments, the core 205 can comprise a step 217, or shoulder, to locate a substantially cylindrical sleeve 312. See, FIG. 3b. In either configuration, an adhesive such as, for example and not limitation, epoxy or a glue sheet can also be used to secure the sleeve 310 to the barrel 220.

In some embodiments, the sleeve assembly 305 can further comprise a cone 315. The cone 315 can be tapered to substantially conform to the handle taper 225 of the bat assembly 200. In this configuration, the cone 315 can create a smooth transition from the end of the sleeve 310 to the handle portion 230, which can prevent mishits and damage caused by hits made on the handle taper 225 or close to the handle 230 (e.g., when a pitcher "jams" the batter).

The multi-piece sleeve assembly 305 enables the sleeve 310 and cone 315 to be replaced separately. This can enable the bat to be tuned by changing, for example, the weight, shape, size, or material of the sleeve 310 and/or cone 315. This can also enable the sleeve 310 and cone 315 to be replaced independently, as necessary, for maintenance purposes (e.g., one or the other cracks during use). This can reduce maintenance costs and increase the useful life of the bat system 200.

Figure 3C:
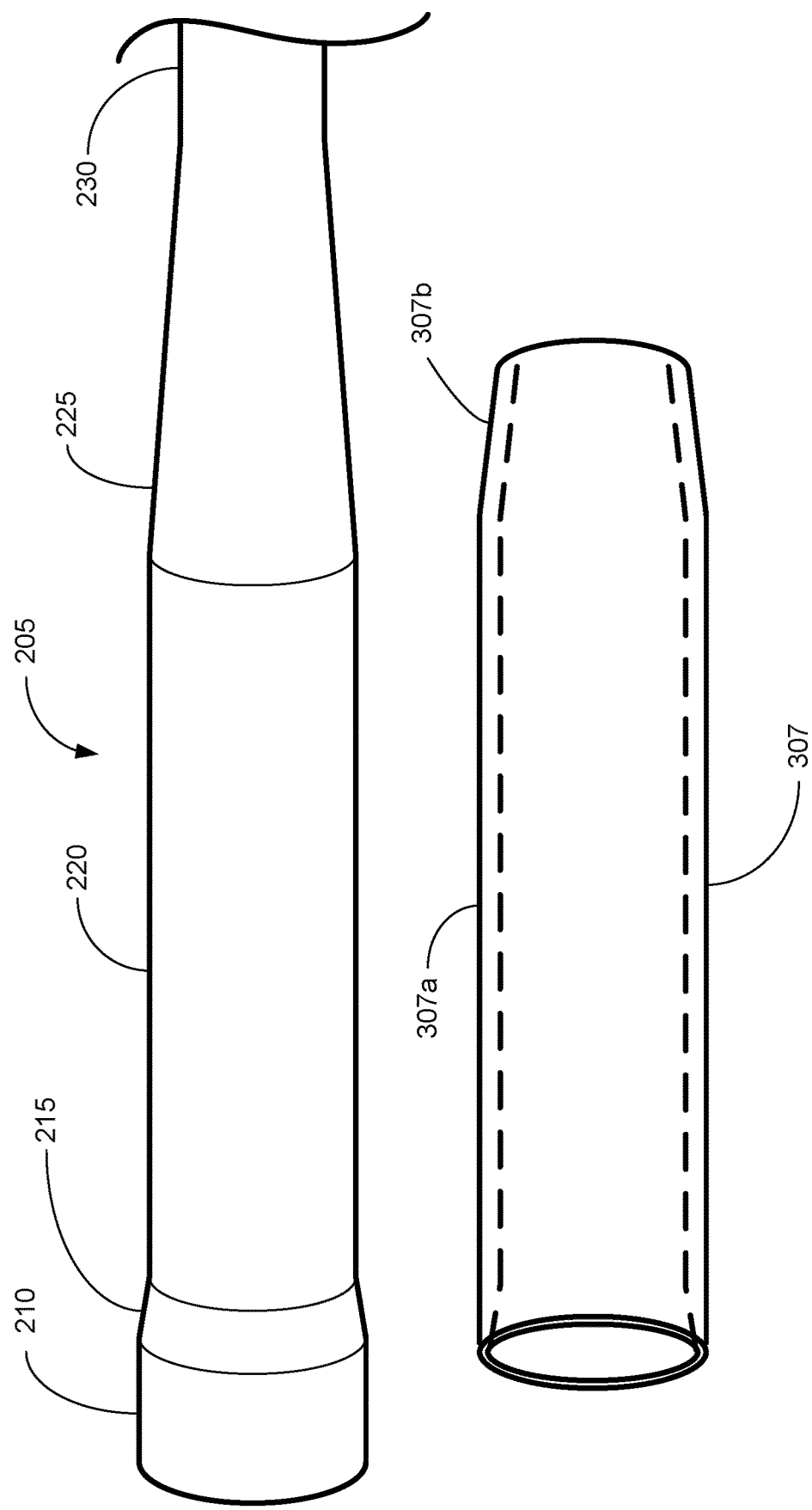
FIG. 3c depicts a one-piece sleeve and the tapered bat core of FIG. 2a, in accordance with some embodiments of the present invention.

In other embodiments, as shown in FIG. 3c, due to the shape of the core 205, the sleeve 310 and cone 315 can comprise a one-piece sleeve assembly 307, which can be installed on the barrel 220 from the handle end 230. In other words, unlike prior art bats, because both tapers 215, 225 on the core 205 reduce in the same direction (i.e., they both get smaller towards the handle), a one-piece sleeve assembly 307 with integral sleeve 307a and cone 307b can be pressed-fit or adhered to the core 205 from the handle end. This configuration can reduce manufacturing costs and increase durability, though it provides a slight reduction in tuneability and serviceability.

In some embodiments, the sleeve 310, 312 and cone 315 can be adhered or press fit to the core 205. The sleeve 310, 312 and cone 315 can comprise, for example and not limitation, nylon, fiberglass, carbon fiber, Kevlar® or combinations thereof. In some embodiments, the sleeve 310, 312 and cone 315 can comprise TPU. In a preferred embodiment, the sleeve 310, 312 and cone 315 can comprise an outer shell of TPU and an inner shell of PU.

In some embodiments, the sleeve 310, 312 can be pressed onto the core 205 from the handle 230 end until it is firmly seated against the taper 215 or shoulder 217 of the core 205. In some embodiments, the sleeve 310, 312 and/or cone 315 can be press fit onto the core 205, obviating the need for adhesives. In other embodiments, the sleeve 310, 312 and/or cone 315 can be adhered to the core 205 using, for example and not limitation, epoxy, glue sheets, or heat shrinking.

In still other embodiments, the sleeve 310 and/or cone 315 can be molded around the core 205. A mold can be placed around the barrel 220 of the core 205, for example, such that the bottom of the mold is substantially aligned with the taper 215 or shoulder 217 proximate the tip portion 210. A suitable material such as, for example and not limitation, liquid (i.e., molten) polyurethane ("PU") can be placed into the mold. The PU can be, for example and not limitation, poured or injected into the mold (e.g., using injection molding techniques). In this configuration, the sleeve 310, 312 can be molded and adhered to the core 205 in a single process.

In yet another embodiment, a mold can be placed around the barrel 220 of the core 205, for example, such that the bottom of the mold is substantially aligned with the taper 215 or shoulder 217 proximate the tip portion 210. Prior to injection molding, a TPU sheet can be formed and placed inside the mold to form the outer layer of the sleeve. A suitable material such as, for example and not limitation, liquid (i.e., molten) polyurethane ("PU") can then be placed into the mold between the core 205 and the TPU sheet. The PU can be, for example and not limitation, poured or injected into the mold (e.g., using injection molding techniques). This can enable a multi-layered sleeve 310, 312 to be molded and adhered to the core 205 in a single process. In this configuration, the TPU outer layer can be approximately 0.1-0.5 mm thick, while the PU inner layer can be approximately 4-10 mm thick. In a preferred embodiment, the TPU layer can be approximately 0.3 mm, while the PU layer can taper from approximately 8 mm proximate the tip portion 210 to approximately 6 mm proximate the handle taper 225.

The density and/or hardness of the sleeve 310, 312 can be varied to reduce the BBCOR of the system 200 to absorb various amounts of energy to meet various regulatory standards. This can enable, for example, a single bat design to meet differing power standards by simply changing the sleeve 310, 312 and/or cone 315. In other embodiments, the thickness and/or composition of the sleeve 310, 312 can be varied to increase or decrease the amount of energy absorbed by the sleeve 310, 312. In some embodiments, the core 205, sleeve 310, 312, and cone 315 can be sold separately to enable a user to participate in multiple series offered by multiple sanctioning bodies using a single system 200. The user can, for example, buy one core 205 and then use interchangeable sleeve 310,312/cone 315 combinations to play in multiple leagues.

In some embodiments, the configuration of the core 205, sleeve 310, 312, and cone 315 can be manipulated to meet the applicable standard. Many sanctioning bodies regulate not only the BBCOR, but, for example and not limitation, the balance point of the bat assembly 200. Because the sleeve 310, 312 may comprise only a small portion of the overall mass of the bat assembly 200, it may be necessary to modify the dimensions of the core 205 to produce the necessary geometry. In some embodiments, therefore, the core 205 and/or the sleeve 310, 312 and cone 315 can be varied to produce the desired result. The configuration of the core 205, sleeve 310, 312, and cone 315 can also be varied, among other things, due to performance requirements in baseball vs. softball, women's vs. men's sports, etc.

TABLE 1

31-32 Inch Bat

| MEASUREMENT POSITION (in) | DIAMETER (in) | WALL THICKNESS (in) |
| --- | --- | --- |
| 1 | 2.58 | 0.102 |
| 4 | 1.98 | 0.110 |
| 6 | 1.98 | 0.110 |
| 9 | 1.98 | 0.100 |
| 11 | 1.62 | 0.092 |
| 14 | 1.14 | 0.086 |
| 16 | 0.92 | 0.090 |
| 19 | 0.88 | 0.094 |
| 21.5 | 0.88 | 0.094 |
| 24 | 0.87 | 0.094 |
| 26.5 | 0.87 | 0.094 |
| 30 | 0.87 | 0.094 |

TABLE 2

33-34 Inch Bat

| T POSITION (in) | OUTER DIAMETER (in) | THICKNESS (in) |
|---|---|---|
| 1 | 2.58 | 0.102 |
| 5 | 1.98 | 0.110 |
| 7 | 1.98 | 0.110 |
| 10 | 1.98 | 0.100 |
| 12 | 1.62 | 0.092 |
| 15 | 1.14 | 0.086 |
| 17 | 0.92 | 0.090 |
| 20 | 0.88 | 0.094 |
| 22.5 | 0.88 | 0.094 |
| 25 | 0.87 | 0.094 |
| 27.5 | 0.87 | 0.094 |
| 30 | 0.87 | 0.094 |

As shown in Tables 1 and 2, above, the dimensions of the core can vary based on, for example, the length of the bat and the intended user (e.g., men, women, or children), among other things. The amount of energy absorbed by the bat can also be varied widely based on the material used for the sleeve. The amount of energy absorbed can be measured using the coefficient of restitution ("COR"). COR, in this case, represents the speed of the ball as it leaves the bat divided by the speed of the ball as it approaches the bat without swinging the bat (i.e., its rebound speed). A COR smaller than one, for example, indicates that a portion of the kinetic energy of the ball is absorbed when it contacts the bat.

Similarly, the energy absorption coefficient (E-abs) can be calculated by dropping a weight on a test piece to obtain a stress-strain curve. In this example, a 20 mm test piece is used and is impacted with a 10 Kg weight from a height of 60 mm. The stress-strain curve can be measured using methods known in the art (e.g., strain gauges). This information can be used to calculate E-abs using equation 1, below:

$$W = \sum_{A=1}^{3} \sum_{i=1}^{n} 2\frac{\mu_i}{\alpha_i}(\lambda_A^{\alpha_i} - 1) + \frac{K}{2}(J-1)^2 \quad (1)$$

Figure 4:
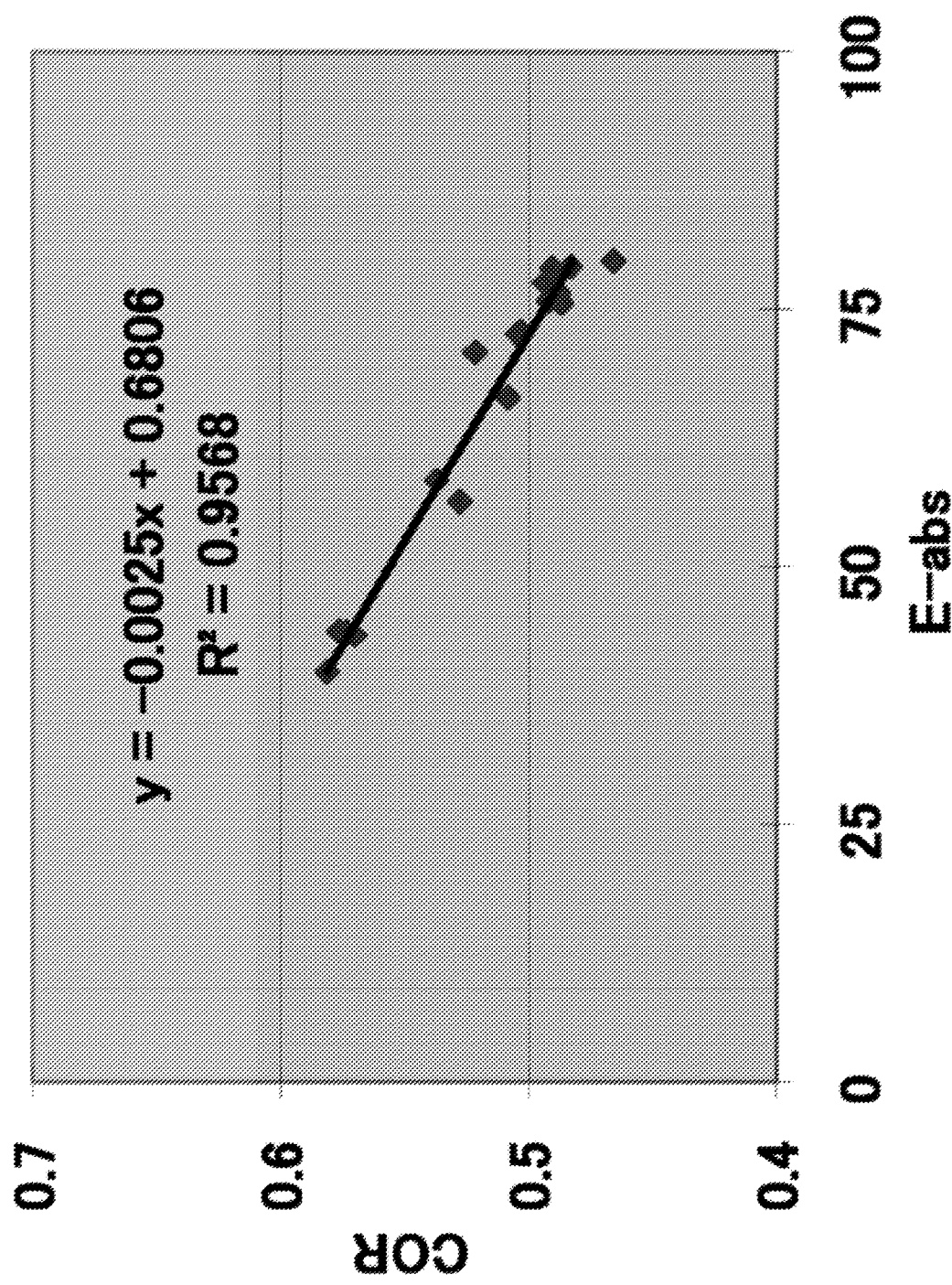
FIG. 4 is a graph comparing coefficient of restitution with energy absorption coefficient, in accordance with some embodiments of the present invention.

Table 3, below, shows various empirical data points based on a wide variety of sleeve and bat configurations. Using this data, FIG. 4 plots COR vs. E-abs. As expected, the COR decreases as E-abs increases. In other words, as the bat absorbs more energy, the ball rebounds at a lower speed. This tuneability enables the bat to be adjusted to meet the rules and regulations for a variety of sanctioning bodies.

TABLE 3

Insert Properties

| Name | Hardness | E-abs | COR |
|---|---|---|---|
| SK3-3(0.4) | | 75.8 | 0.492 |
| SK3-3(0.5) | | 76.6 | 0.488 |
| SK3-3(0.6) | | 77.6 | 0.494 |
| SK3-3(50/100) | | 78.9 | 0.491 |
| SK3-3(55/100) | | 79.1 | 0.483 |
| Mar. 31, 2011 | | | 0.528 |
| Adult | | | 0.470 |
| Adult(ρ) | | 78 | 0.487 |
| sk0-1 | | 68 | 0.537 |
| sk1-1 | | 58 | 0.528 |
| sk1-2 | | 80 | 0.466 |

TABLE 3-continued

Insert Properties

| Name | Hardness | E-abs | COR |
|---|---|---|---|
| sk3-2 | | 71 | 0.522 |
| Feb. 15, 2011 | | | 0.528 |
| Black | 85 | 66.5 | 0.508 |
| Gray | 60 | 72.6 | 0.505 |
| Nov. 19, 2010 | — | — | 0.528 |
| チェラスト安 0.45 | 60 | 43.7 | 0.577 |
| チェラスト安 0.5 | 65 | 39.8 | 0.581 |
| チェラスト硬 0.45 | 70 | 43.4 | 0.576 |
| チェラスト硬 0.5 | 75 | 43.6 | 0.574 |
| 三栄 | | 72.8 | 0.503 |
| Sep. 22, 2010 | — | — | 0.528 |
| SK3-3 | 67 | 75.9 | |
| SK3-2 | 86 | 63.6 | |
| White | 49 | 62.9 | |
| Toral (エステル) | 77 | 55.4 | |
| SK6-2 | 75 | 58.6 | |
| EC3662 | 79 | 49.2 | |
| Toral1 | 81 | 69.7 | |
| Toral2 | 81 | 69.2 | |

Figure 5:
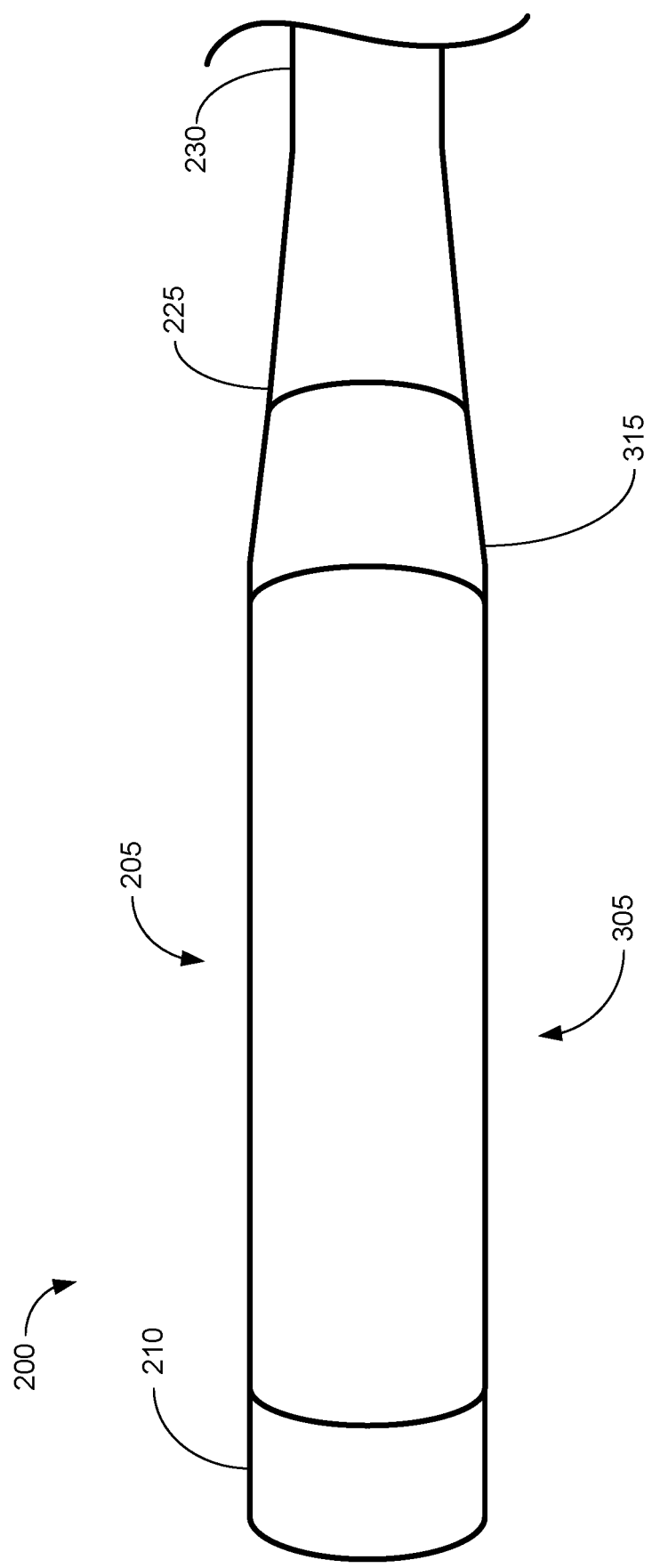
FIG. 5 depicts a two-piece sleeve assembled on a bat core, in accordance with some embodiments of the present invention.

As shown in FIG. 5, the assembled bat system 200 provided a rigid core 205 partially clad in a sleeve assembly 305. The sleeve assembly 305 provides a smooth transition between the tip portion 210 of the core 205. The smooth transition enables clean hits even when the location of contact overlaps the core 205 and the sleeve assembly 305. In this configuration, the assembled system 200 offers a bat with a substantially conventional profile, while providing the tuneability necessary to meet a variety of regulations.

Figure 6:
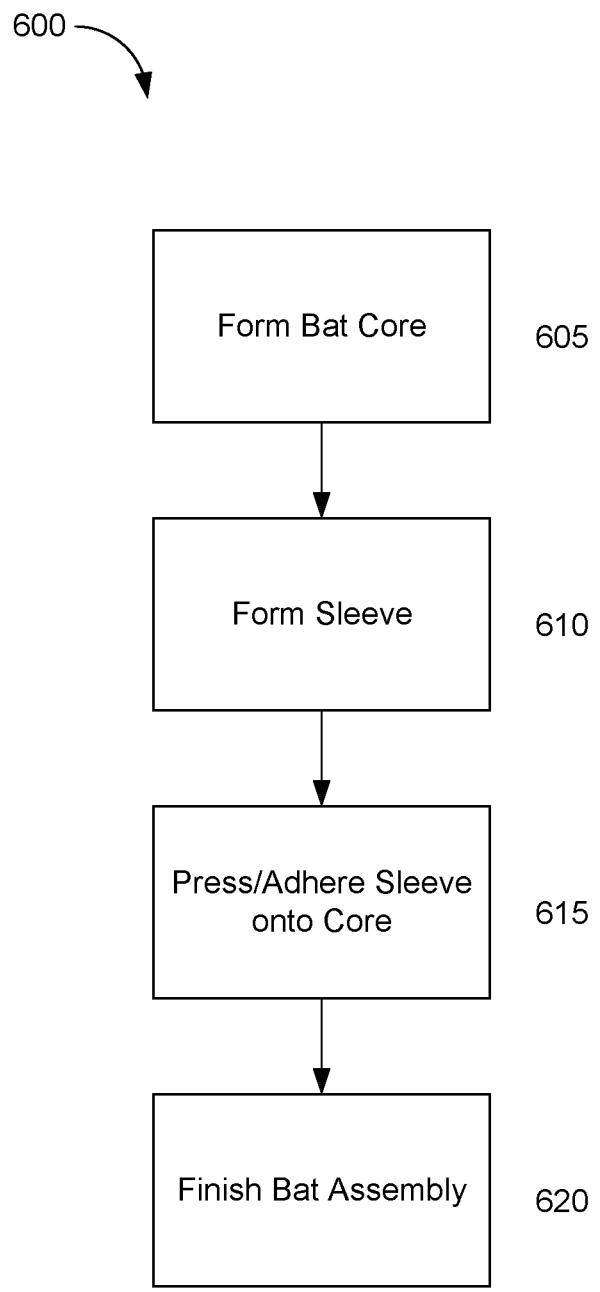
FIG. 6 is a flowchart for a method of pressing a sleeve onto a bat, in accordance with some embodiments of the present invention.

As shown in FIG. 6, embodiments of the present invention can also comprise a method 600 for manufacturing a bat with an exterior sleeve. In some embodiments, a tube of a suitable material such as, for example and not limitation, aluminum, carbon fiber, Kevlar®, fiberglass, or combinations thereof can be molded 605 to form a bat core. In a preferred embodiment, the core can comprise aluminum and can be, for example, blow molded, forged, or swaged to form the core.

In some embodiments, the method 600 can further comprise forming 610 the sleeve assembly out of, for example and not limitation, carbon fiber, Kevlar®, or fiberglass. Depending on the material, the sleeve, and/or cone can be formed 610 using a suitable method including, but not limited to, injection molding, blow molding, or vacuum molding. In some embodiments, the sleeve assembly can comprise TPU, PU, or a combination thereof. The sleeve and cone can be injection molded 610, for example, for reduced cost with good finish quality. In other embodiments, the sleeve assembly can be molded 610 in a single part. After forming 610, the sleeve and/or cone can be press fit or adhered 715 to the core. In some embodiments, the bat assembly can be finished 620 (e.g., turned on lathe or sanded) for improved fit and finish, as well as final sizing of the bat assembly.

Figure 7:
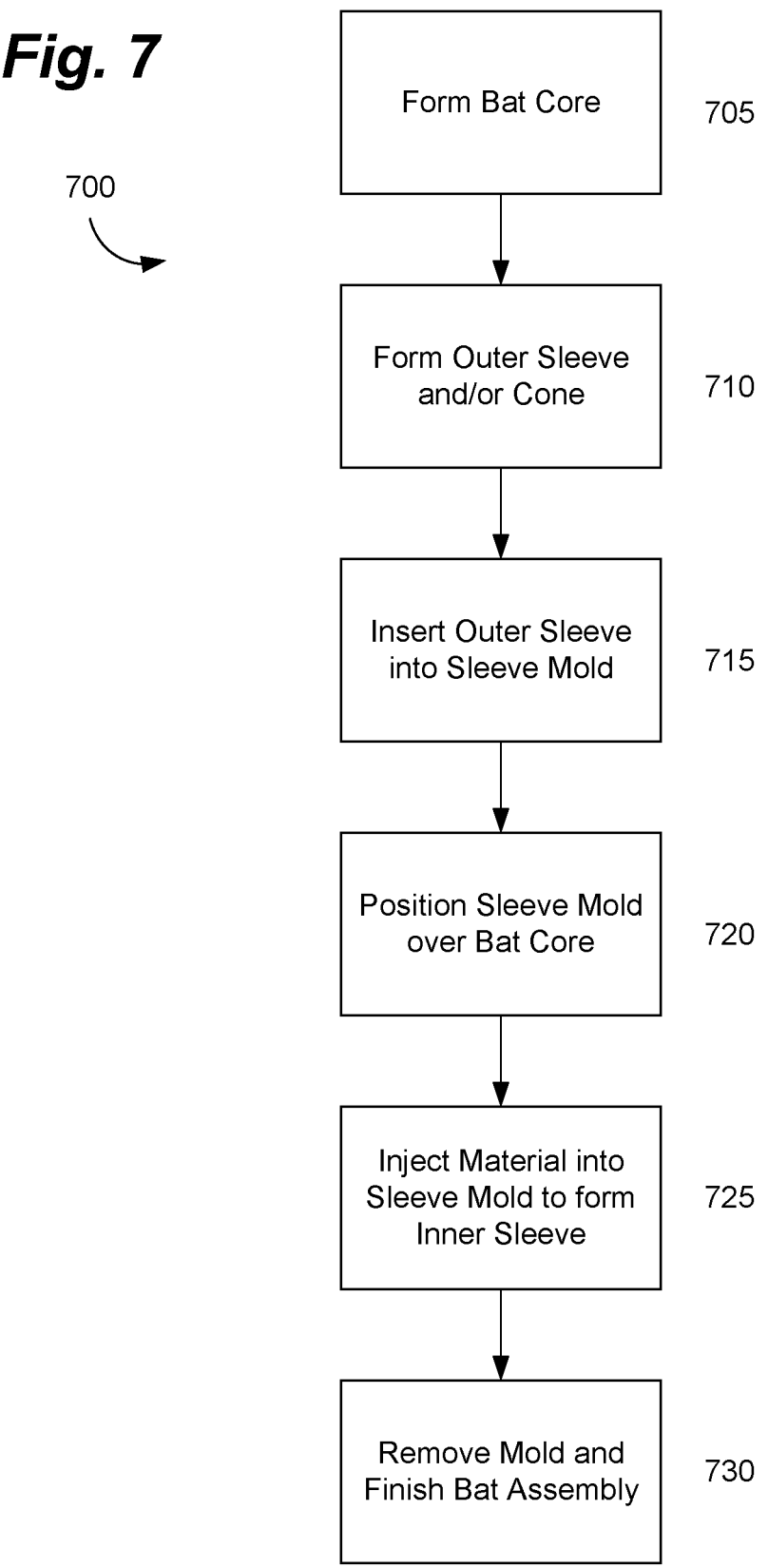
FIG. 7 is a flowchart for a method of molding a composite sleeve onto a bat, in accordance with some embodiments of the present invention.

As shown in FIG. 7, embodiments of the present invention can further comprise a method of manufacturing a bat 700 comprising partially molding the sleeve in place. As before, a tube of a suitable material such as, for example and not limitation, aluminum, carbon fiber, Kevlar®, fiberglass, or combinations thereof can be molded 705 to form a bat core. In a preferred embodiment, the core can again comprise aluminum and can be, for example, blow molded, forged, or swaged to form the core.

The method 700 can further comprise forming 710 the sleeve assembly out of, for example and not limitation, carbon fiber, Kevlar®, or fiberglass. Depending on the material, the sleeve, and/or cone can be formed 710 using a suitable method including, but not limited to, injection molding, blow molding, or vacuum molding. In a preferred embodiment, an outer sleeve and/or cone can be injection molded from TPU. The outer sleeve can be molded such that the inner diameter of the outer sleeve is larger than the outer diameter of the bat barrel. The outer sleeve can then be placed into a sleeve mold 715 that is substantially the same shape as the outer sleeve.

The sleeve mold can then be positioned over the core 720 such that the outer sleeve is concentrically located about the core and such that a first end of the outer sleeve is aligned with the barrel taper (or step). In this manner, the outer sleeve is properly located on and about the bat, but a concentric space exists between the outer sleeve and the barrel. Material can then be injection molded 725 into the space between the outer sleeve and the core. This provides an inner sleeve and affixes the outer sleeve to the barrel. In a preferred embodiment, the inner sleeve can comprise PU. The sleeve mold can then be removed 730 and final finishing can be performed (e.g., to remove extra material, smooth edges, etc.)

Figure 8A:
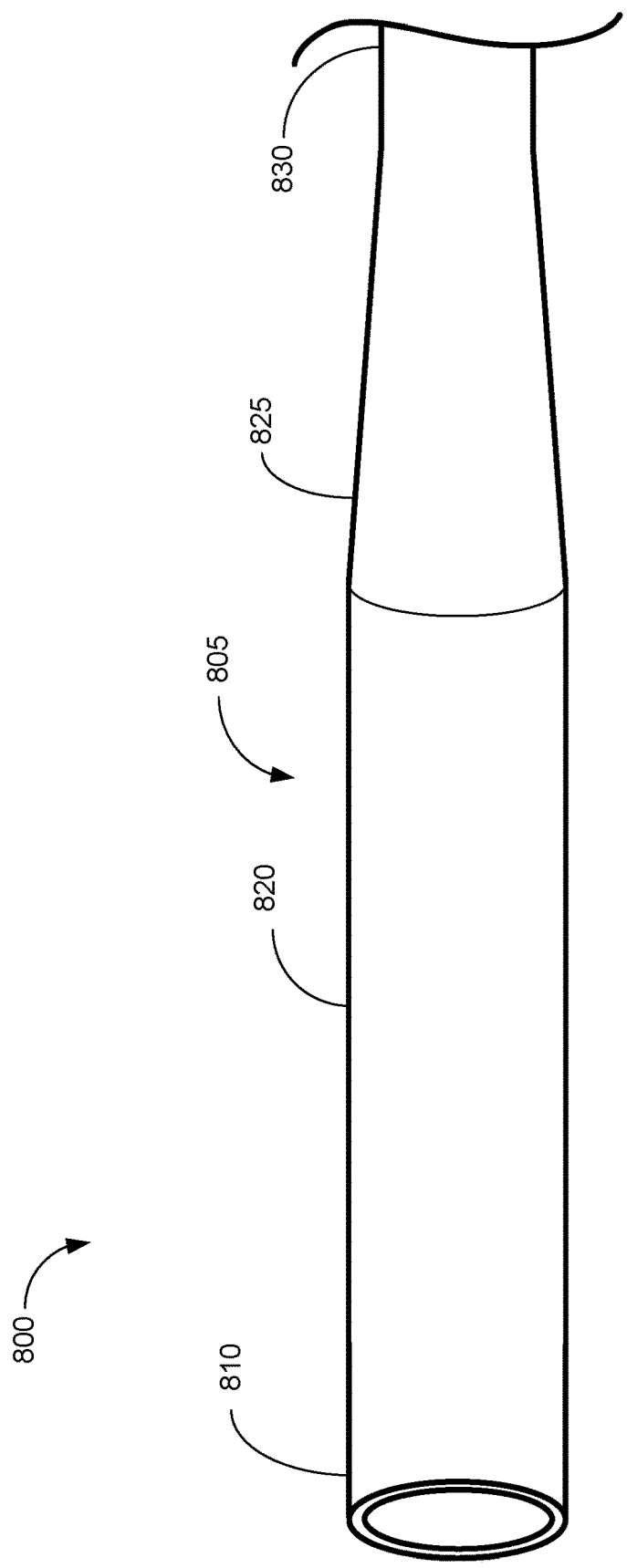
FIG. 8a depicts a hybrid bat body with no flanges, in accordance with some embodiments of the present invention.

As mentioned above, flanges on the bat barrel increase manufacturing costs, decrease serviceability, and can produce weak spots in the bat. To this end, in some embodiments, as shown in FIG. 8a, embodiments of the present invention can comprise a bat with no steps or flanges. In some embodiments, therefore, the bat 800 can comprise a rigid core 805 with a handle taper 825 and a handle 830. In this configuration, however, a barrel portion 820 and tip portion 810 of the bat 800 can be substantially the same diameter, without a step, or shoulder, as in previous embodiments.

In some embodiments, the barrel of the bat can be stepless. In other words, while the barrel may be tapered toward the tip, tapered toward the handle, or cylindrical, it does not contain any abrupt changes in profile (i.e., the profile is preferably continuous rather than discontinuous in the mathematical sense). The lack of a step or shoulder can improve the strength of the bat by preventing sharp corners, for example, that result in stress risers. In addition, the stepless design can enable the core bat 800 to be more easily manufactured (e.g., extruded) without requiring additional forming steps. The stepless design can also provide a more consistent hitting feel along the length of the barrel 820 due to the more consistent profile.

Figure 8B:
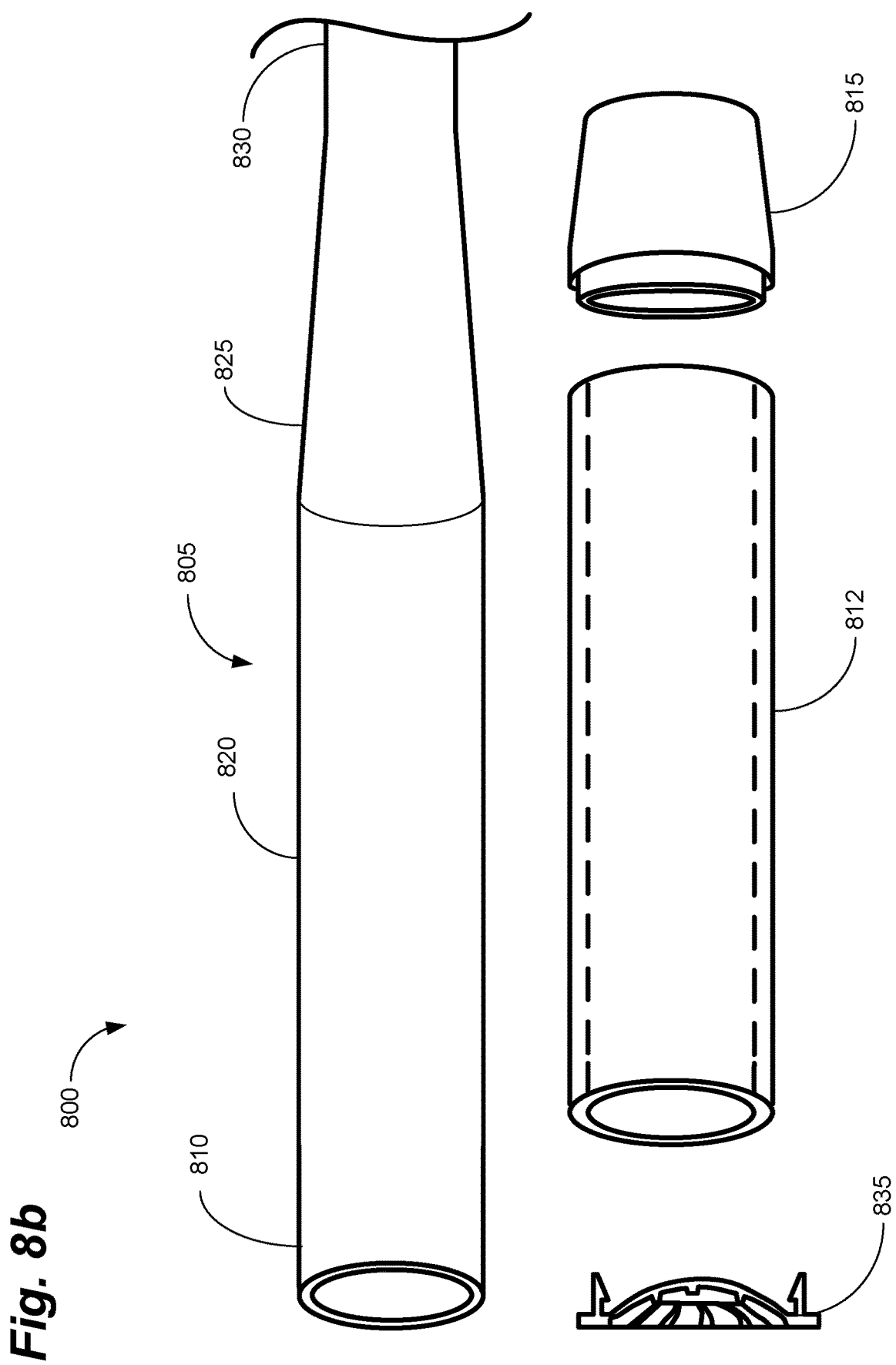
FIG. 8b depicts the hybrid bat body of FIG. 8a with a two-piece sleeve and cap, in accordance with some embodiments of the present invention.
Figure 8C:
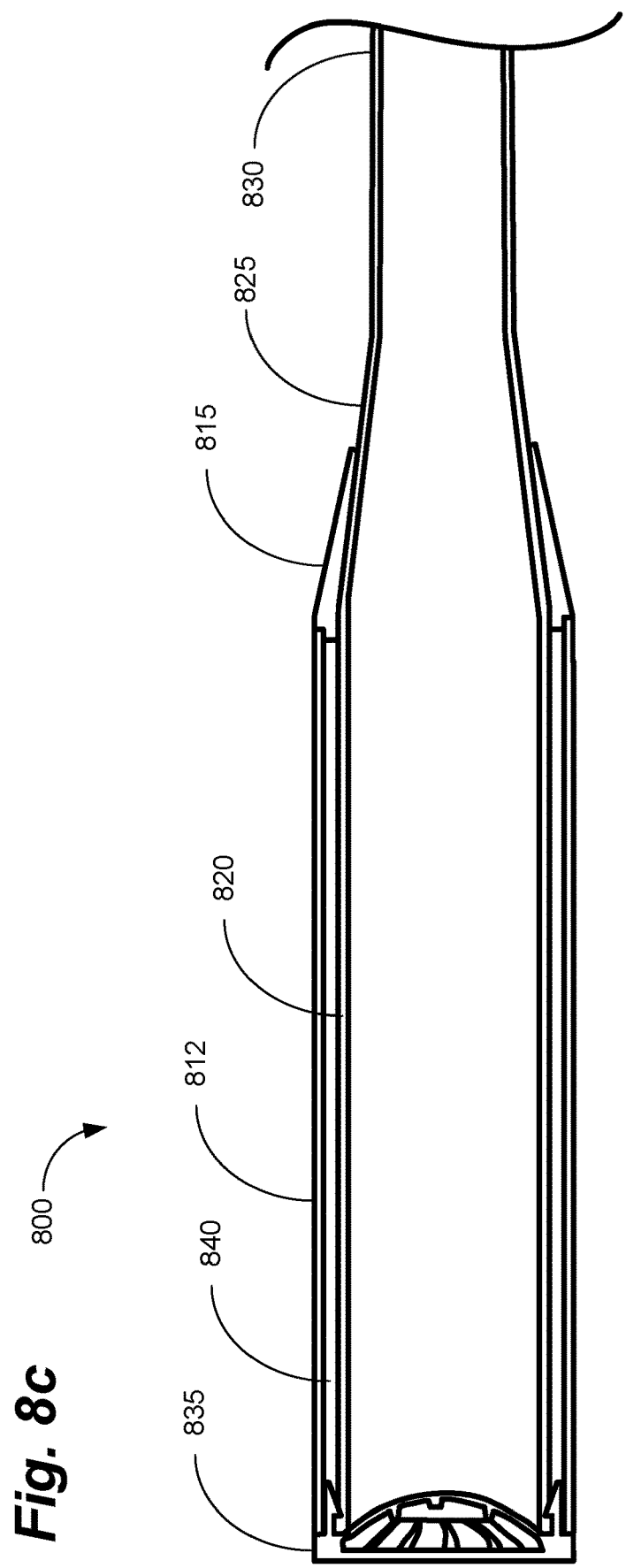
FIG. 8c depicts a cross-sectional view of the assembled hybrid bat body with a two-piece sleeve and cap of FIG. 8b, in accordance with some embodiments of the present invention.
Figure 8D:
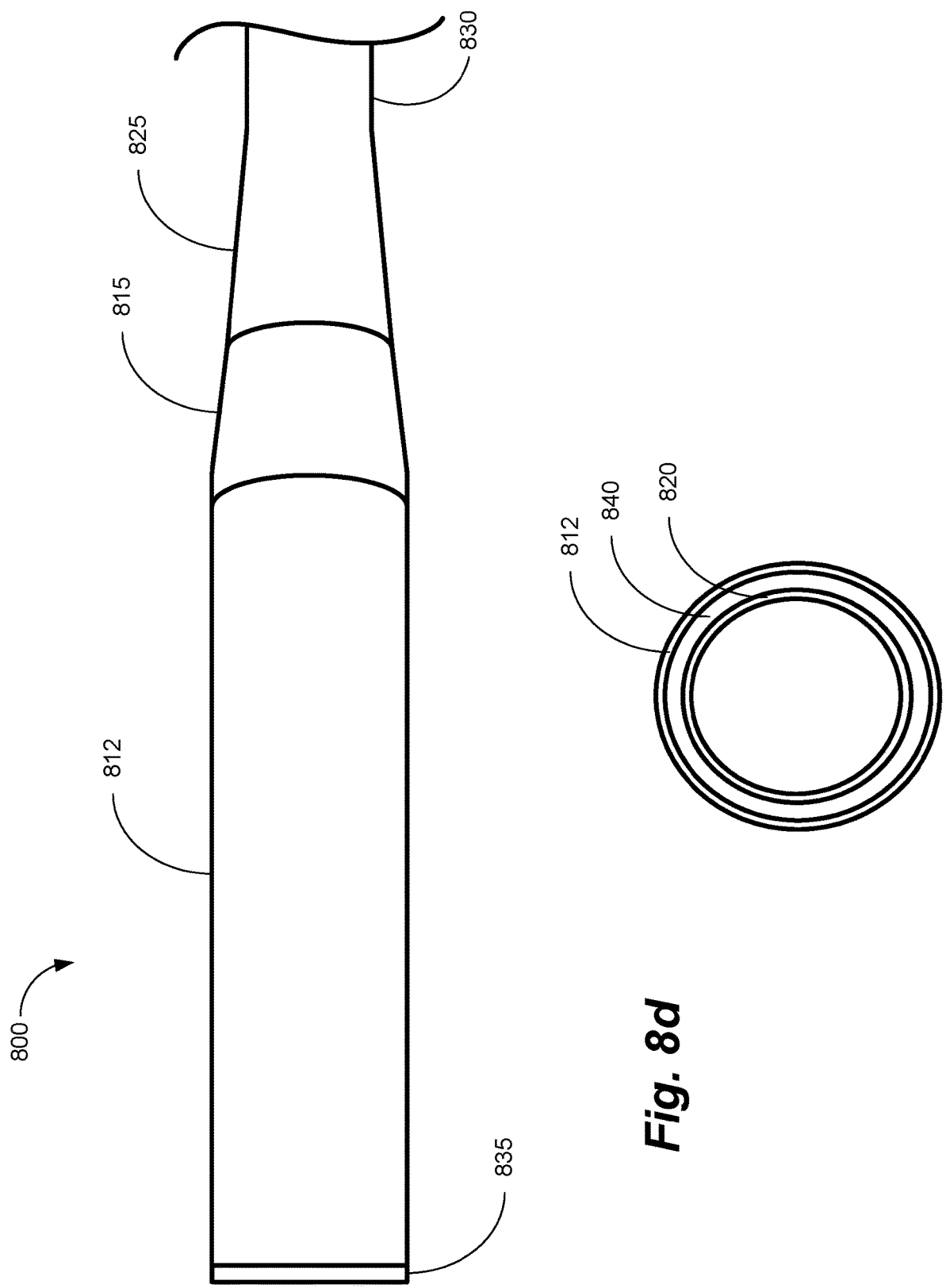
FIG. 8d depicts an exterior view of the assembled hybrid bat body with a two-piece sleeve and cap of FIG. 8b, in accordance with some embodiments of the present invention.

As shown in FIGS. 8b-8d, in some embodiments, the bat 800 can further comprise a cap 835, a sleeve 812, and a cone 815. In this manner, the sleeve 812 can be positioned over the barrel 820 from either end. In some embodiments, the cap 835 can be placed on the bat 800 proximate the first portion 810 of the barrel 820 and can locate the sleeve 812 on the barrel 820. In other words, the cap 835 can locate the sleeve 812 such that it is substantially aligned with the end of the barrel 820, such that the sleeve 812 is concentric with the barrel 820, or both.

In some embodiments, the sleeve 812 and cone 815 can be press-fit on the barrel 820. In other embodiments, the sleeve 812 and cone 815 can be adhered to the barrel 820 using, for example and not limitation, epoxy, glue sheets, or heat shrinking.

In still other embodiments, the sleeve 812 can be placed over the barrel 820 and an internal sleeve material 840 can be injected between the sleeve 812 and the barrel 820. The material 840 can be, for example and not limitation, glue, resin, or rubber. In a preferred embodiment, the material 840 is polyurethane. After injection, the inner sleeve material 840 can cool and solidify, substantially affixing the sleeve 812 to the barrel 820. In some embodiments, the cap 835 can be used as a "stop" to prevent material from extruding out the end of the bat 800. In other embodiments, the cap 835 can be inserted after the inner sleeve 840 has cooled to prevent debris from entering the bat 800. In still other embodiments, the cap 835 can be inserted into the sleeve material 840 while it is still in liquid form affixing the cap 835 to the bat 800. This can prevent tampering, for example, by the end user.

In some embodiments, the inner sleeve 840 can be used to "tune" the bat 800. In other words, a softer material for the inner sleeve 840 can provide dampening, reducing vibration and slightly detune the BBCOR of the bat 800. In other embodiments, the inner sleeve 840 can comprise a material with a relatively high coefficient of restitution, resulting in a "hotter" bat. The inner sleeve 840 can be used, for example, to meet various sanctioning body (e.g., NCAA) BBCOR requirements.

Figure 9A:
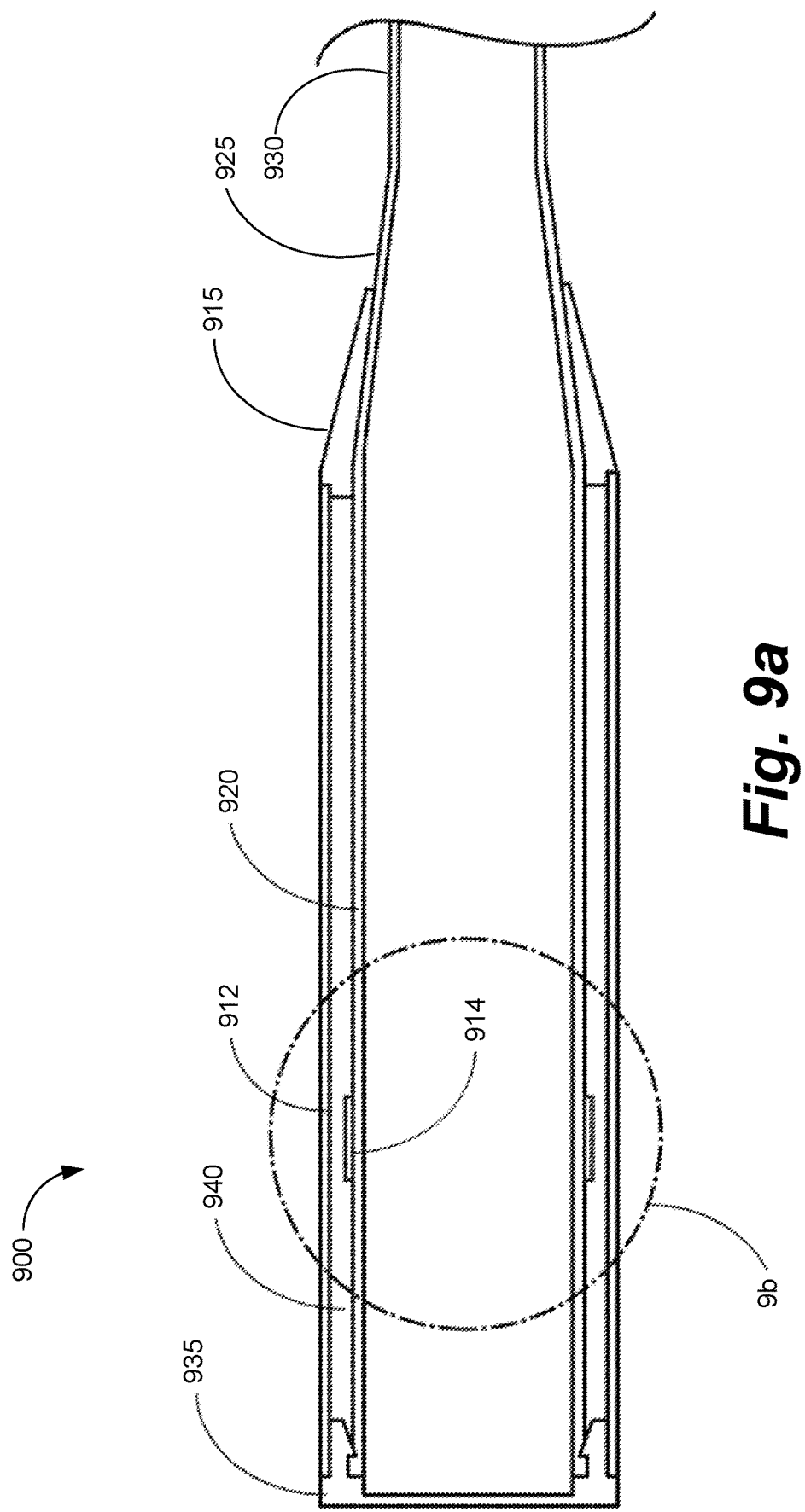
FIG. 9a depicts a cross-sectional view of a hybrid bat body with a multi-piece sleeve, in accordance with some embodiments of the present invention.
Figure 9B:
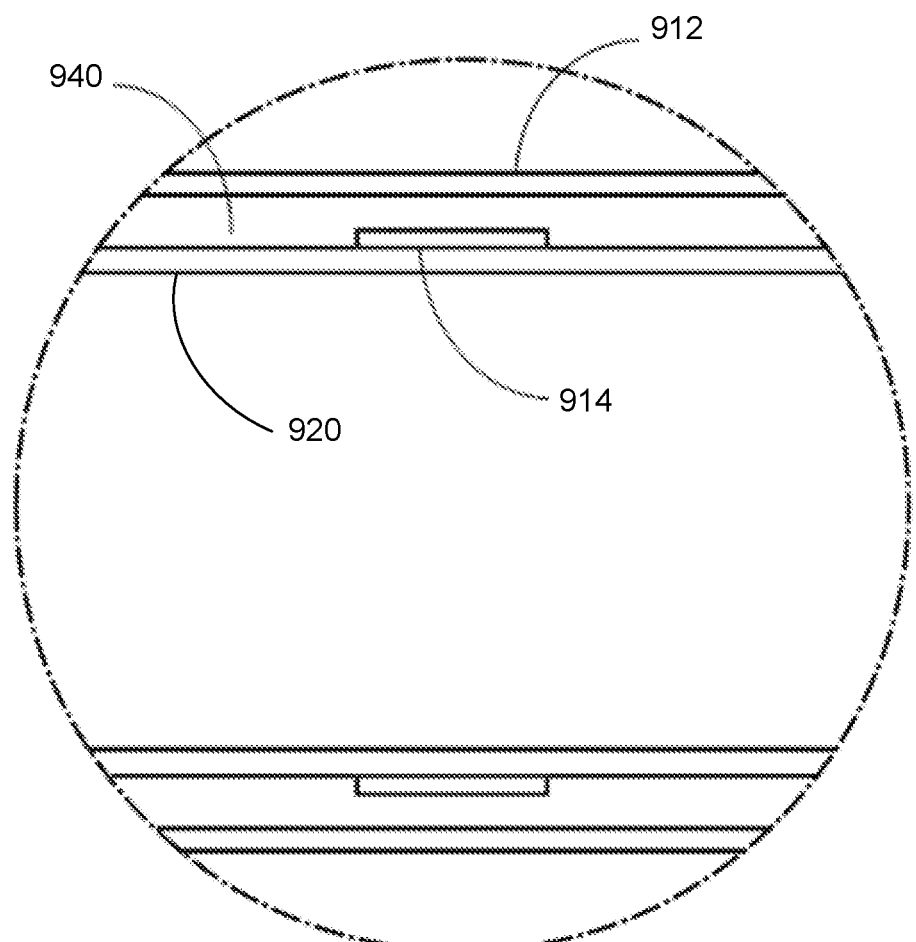
FIG. 9B depicts a magnified view of a portion of FIG. 9a, in accordance with some embodiments of the present invention.

Referring to FIGS. 9a and 9b, some embodiments of the bat 900 can comprise a rigid core with a handle taper 925 and a handle 930. In certain embodiments, the bat 900 can comprise a stepless design as described above.

In certain embodiments, the bat 900 can further comprise a cap 935, an outer sleeve 912, and a cone 915 such that the outer sleeve 912 can be positioned over the barrel 920 from either end. In some embodiments, the outer sleeve 912 can be attached, affixed, or otherwise connected to the cone 915. For example, in some embodiments, the outer sleeve 912 and the cone 915 can be press-fit together. In some embodiments, the cone 915 can be attached, affixed, or otherwise connected to the barrel 920. For example, in some embodiments, the cone 915 may be press-fit on the barrel 920. In other embodiments, the outer sleeve 912 and cone 915 can be adhered to the barrel 920 using, for example and not limitation, epoxy, glue sheets, or heat shrinking. In certain embodiments, the outer sleeve 912 may be separated from the barrel 920 such that the outer sleeve 912 does not directly contact the barrel 920.

According to some embodiments, the bat can also include a ring portion 914. In some embodiments, the ring portion 914 can be connected, attached, or otherwise adhered to the barrel portion 920. In certain embodiments, the ring portion 914 may be an annular piece of material that is positioned on the barrel portion 920. In some embodiments, the ring portion 914 may be a length of material that wrapped about the circumference of the barrel portion 920. In certain embodiments, the ring portion 914 can comprise a single material. In some embodiments, the ring portion 914 can comprise multiple materials. In some embodiments, the ring portion 914 can comprises multiple strips or multiple rings of material. In some embodiments, the ring portion 914 can be located at a predetermined longitudinal location along the barrel portion 920. For example, in some embodiments, the ring portion 914 can be located at or proximate to the traditional "sweet spot" of the bat 900. A bat's sweet spot is generally determined to be the location corresponding to the bat's maximum performance, which may be a location along the bat 900 where the coefficient of restitution is greatest. As used herein, the traditional sweet spot refers to the location of the bat 900 that would produce the greatest coefficient of restitution if the bat 900 did not include a ring portion 914 (see, e.g., FIGS. 8a-8d). As will be explained in more detail, the inclusion of a ring portion 914 may increase the area or number of locations along the bat 900 that produce the greatest coefficient of restitution, and this increased area or number of locations that produce the greatest coefficient of restitution may be referred to as the bat's 900 effective sweet spot. According to some embodiments, the effective sweet spot of the bat 900 may be larger than the traditional sweet spot of the bat 900. In some embodiments, the traditional sweet spot may be located at or near a location approximately 4 inches to approximately 7 inches from the cap end of the bat 900. For example, in certain embodiments, the traditional sweet spot may be approximately 6 inches from the cap end of the bat 900.

In some embodiments, the ring portion 914 can be positioned on the barrel 920, the outer sleeve 912 can be placed over the barrel 920, and an internal sleeve material 940 can be injected, poured, or otherwise introduced between the sleeve 912 and the barrel 920. The material 940 can be, for example and not limitation, glue, resin, or rubber. In certain embodiments, the material 940 is polyurethane. After injection, the inner sleeve material 940 can cool and solidify into an inner sleeve 940, substantially affixing the outer sleeve 912 to the barrel 920 and/or substantially affixing the ring portion 914 in place with respect to the barrel 920 and/or outer sleeve 912. In certain embodiments, the ring portion 914 may be separated from the outer shell 912 by a portion of the inner sleeve 940, which may prevent the bat from having a soft or easily compressed area corresponding to the location of the ring portion 914 along the barrel 920.

In some embodiments, the cap 935 can be used as a "stop" to prevent material 940 from extruding out the end of the bat 900. In other embodiments, the cap 935 can be inserted after the inner sleeve 940 has cooled to prevent debris from entering the bat 900. In some embodiments, the cap 935 can be inserted into the sleeve material 940 while it is still in non-solid form, affixing the cap 935 to the bat 900. This can prevent tampering, for example, by the end user.

According to some embodiments, the inner sleeve 940 can comprise a relatively high-performance material, and the ring portion 914 can comprise a relatively low-performance material. According to certain embodiments, high-performance materials may be indicative of materials having a relatively high coefficient of restitution, and low-performance materials may be indicative of materials having a relatively low coefficient of restitution.

In certain embodiments, the sleeve portion 912 and the ring portion 914 can comprise materials of differing densities and/or chemical compositions, such as differing PU materials. In some embodiments, the bat 900 can comprise a ring portion 914 comprising a relatively low-performing material, and the portions of the bat 900 on either side of the ring portion 914 can comprise a relatively high-performing PU foam. Thus, in some embodiments, the traditional sweet spot of the bat 900 can comprise a relatively low-performing material or combination of materials, and the portions of the bat 900 on either side of the traditional sweet spot can comprise a relatively high-performing material or combination or materials. This may result in a larger effective sweet spot of the bat 900 while complying with performance limitations (e.g., BBCOR) imposed by the rules and regulations of a sanctioning body.

In some embodiments, the ring portion 914 can have a predetermined thickness that can, depending on the thickness, increase or decrease the performance of the bat 900 at or near the traditional sweet spot. In some embodiments, the thickness of the ring portion 914 can be in the range of approximately 1 mm to approximately 5 mm, which may decrease the performance of the bat 900 at or near the traditional sweet spot, permitting a higher performing material or combination of materials to be used at other areas along the barrel 920, which may provide a larger effective sweet spot of the bat 900. In certain embodiments, the thickness of the ring portion 914 can be in the range of approximately 5 mm to approximately 10 mm, which may further decrease the performance of the bat 900 at or near the traditional sweet spot, permitting an even higher performing material or combination of materials to be used at other areas along the barrel 920, which may provide an even larger effective sweet spot of the bat 900. In certain embodiments, the ring portion 914 can be centered at a location that corresponds to the traditional sweet spot of the bat system 200. In some embodiments, the ring portion 914 can be centered at a location that is approximately 6 inches from the cap end of the bat system 200. In some embodiments, the width of the ring portion 914 can be in the range of approximately one-fourth to one-third the length of the barrel portion 220. For example, in certain embodiments, the width of the ring portion 914 can be 3 inches. In certain embodiments, the width of the ring portion 914 can be in the range of approximately 3 inches to approximately 6 inches. In some embodiments, the width of the ring portion 914 can be selected to correspond to the traditional sweet spot of the bat 900, which is generally 1 inch to 4 inches wide.

EXAMPLES

In some embodiments, the use of a resilient inner sleeve 840 can support the outer sleeve 812 enabling it to be thinner. In some embodiments, for example, the outer sleeve 812 can comprise a tube of TPU that is between approximately 0.2 mm and 1.0 mm, while the inner sleeve 840 can comprise a layer of PU with a thickness of between approximately 6 mm and 10 mm. In a particular embodiment, the outer sleeve 812 can be approximately 0.3 mm and the inner sleeve 840 can be approximately 8 mm.

In some embodiments, the thickness of the barrel 820 can also be varied. In some embodiments, as shown in Table 4, below, for example, the thickness of the barrel 820 can be varied to provide a consistent hitting feel. In some embodiments, the BBCOR of the bat 800 can be larger towards the tip (i.e., near the cap 835) and smaller towards the handle 830. In other embodiments, the BBCOR can be smaller towards the tip (i.e., near the cap 835) and larger towards the handle 830. In other words, the bat 800 can be tuned to meet the needs of individual users or to reduce the differential between balls that are hit in the sweet spot and those that are not.

TABLE 4

Barrel Thickness

| Distance from end of bat (in) | Distance from end of bat (mm) | Outer Diameter (mm) | MC2-T1 Thickness (mm) | MC2-T2 Thickness (mm) | MC2-T3 Thickness (mm) |
|---|---|---|---|---|---|
| 1 | 25.4 | 50 | 2.6 | 2.4 | 2.2 |
| 2 | 50.8 | 50 | 2.6 | 2.4 | 2.2 |
| 3 | 76.2 | 50 | 2.6 | 2.4 | 2.2 |
| 4 | 101.6 | 50 | 2.7 | 2.6 | 2.5 |
| 5 | 127 | 50 | 2.8 | 2.8 | 2.8 |
| 6 | 152.4 | 50 | 2.8 | 2.8 | 2.8 |
| 7 | 177.8 | 50 | 2.8 | 2.8 | 2.8 |
| 8 | 203.2 | 50 | 2.7 | 2.7 | 2.7 |
| 9 | 228.6 | 50 | 2.6 | 2.6 | 2.6 |
| 10 | 254 | 50 | 2.5 | 2.5 | 2.5 |

Figure 10:
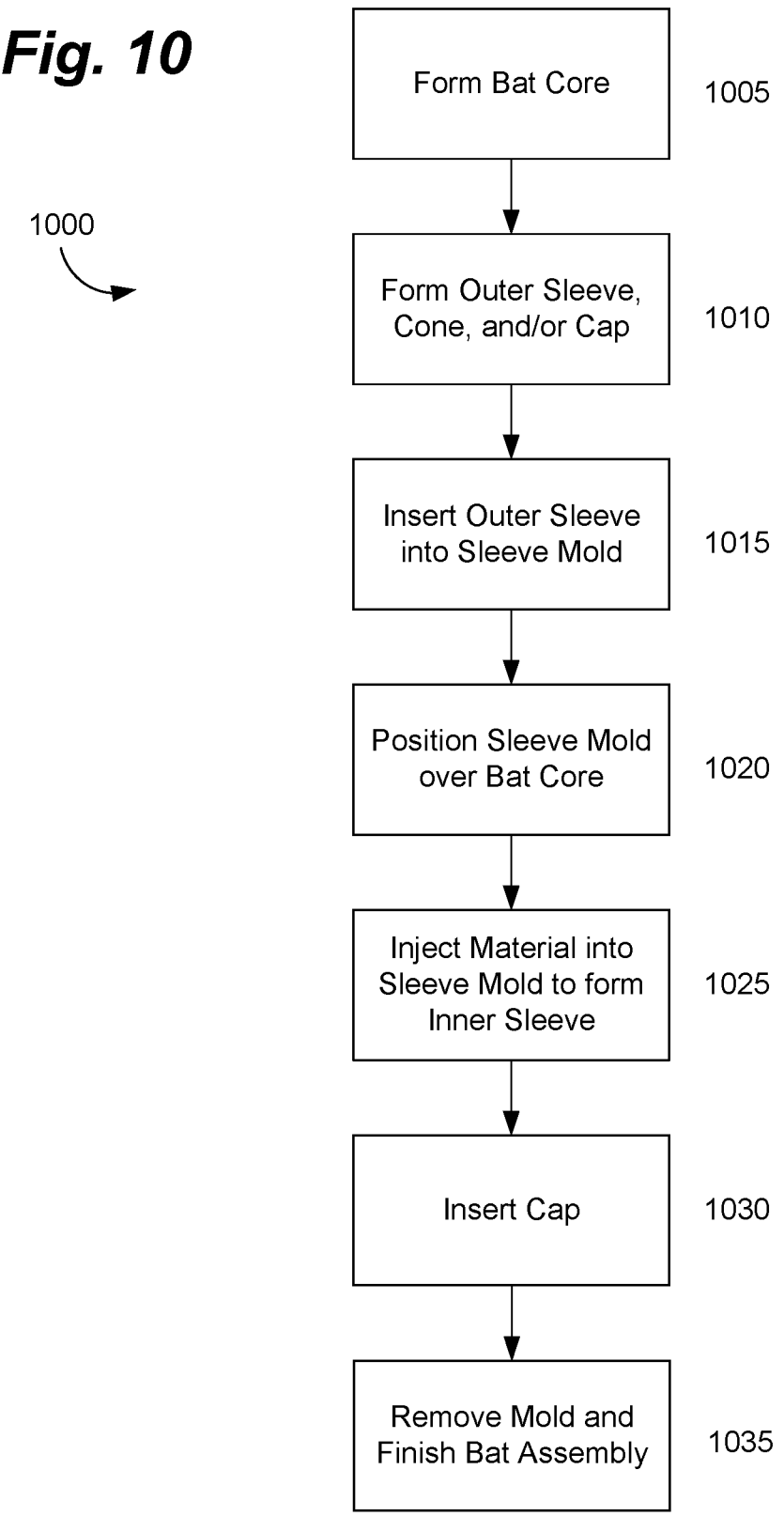
FIG. 10 is a flowchart for a method of molding a two-piece composite sleeve and cap onto a bat with no flanges, in accordance with some embodiments of the present invention.

Embodiments of the present invention can also comprise a method 1000 for manufacturing a composite bat with a stepless barrel. As shown in FIG. 10, in some embodiments, the process can include forming the bat core 1005. In some embodiments, the bat core can comprise a metal such as, for example and not limitation, aluminum. The bat core can be formed 1005 by conventional means such as, for example, forging or extrusion. Because of the stepless design, the core is more easily extruded (i.e., no steps in extrusion process are required) and can also be more easily forged (the stepless design facilitates forging and removal from the dies).

The process can also include forming the outer sleeve, cone, and cap 1010. In some embodiments, the sleeve, cone, and cap can be formed from TPU. The stepless design of the barrel enables a corresponding stepless design for the inner surface of the sleeve. In this manner, the sleeve can be easily cast or extruded from TPU, or other similar materials. In other embodiments, the sleeve, cone, and cap can be formed from other materials such as, for example, carbon fiber, fiber glass, or other composite materials. The stepless design can enable the sleeve to be laid up or molded from these materials using simple mandrels. This reduces manufacturing costs and reduces waste at least by making the various parts easier to remove from the forming mandrels.

In some embodiments, the outer sleeve can be placed into a sleeve mold 1015. The sleeve mold can hold the sleeve securely and such that it is ultimately substantially concentric with the bat core, as discussed below. In some embodiments, the sleeve mold can reinforce the outer sleeve to enable the inner sleeve material to be injected under pressure. This can prevent the outer sleeve from deforming during manufacture and can prevent splitting or other damage to the outer sleeve.

In some embodiments, the sleeve mold can be placed over the bat core 1020. The sleeve mold can be positioned such that it is centered over (i.e., concentric with) the bat barrel. In some embodiments, the sleeve mold can include temporary or permanent stand-offs to ensure proper spacing. In other embodiments, the sleeve mold and bat core can be inserted into a jig that secures these components in proper orientation.

In some embodiments, once the mold and core are in place, material can be injected in between the TPU outer shell and the bat core 1025. This can enable the outer shell to be resiliently adhered to the bat core. In addition, as mentioned above, the injected material can be varied to vary the BBCOR and other characteristics of the bat. In some embodiments, the injected material can be polyurethane. In other embodiments, the injected material can be, for example and not limitation, polyester resin, synthetic or natural rubber, or other polymers.

In come embodiments, the cap and cone can be placed on the tip and taper portion of the bat, respectively, 1030. In some embodiments, the cap can comprise a locator (e.g., tabs or ridges) to properly locate the cap in the end of the bat. In some embodiments, the cap can be used to properly locate the bat core and outer shell. In this configuration, the cap can be inserted prior to inject of the inner sleeve material 1025. In other embodiments, the cap can be inserted after injection 1025 and can seal the end of the bat.

The cone can also be placed over the handle taper portion of the bat to seal the taper portion of the bat. In some embodiments, the cap, the cone, or both can be inserted in the bat before the injected material dries/cools/hardens. In this manner, the cap and cone can substantially seal the ends of the outer sleeve and core. In other embodiments, the cap and/or cone can be affixed to the bat using, for example and not limitation, glue, epoxy, rivets, or screws.

The bat can then be removed from the mold and completed 1035. In some embodiments, this can include final sanding and finishing. In some embodiments, the bat can be painted and/or stickers or decals installed. If preferred, the handle can be wrapped with an appropriate wrap for improved comfort and grip. In some embodiments, the cap and/or cone can be assembled after the bat has been removed from the mold. Of course, bat assembly could include more or less steps or could be performed in a different order based on, among other things that materials chosen. In some embodiments, for example, the end cap can be inserted into the bat prior to the injection of PU and, as such, can act as a "stopper" to ensure the correct file for the inner sleeve. In some embodiments, the PU can also act as an adhesive for the end cap substantially preventing tapering with the barrel of the bat.

Referring to FIG. 11, in some embodiments, the process 1100 can include forming 1105 the bat core; forming 1110 the outer sleeve, cone, and cap; and placing 1115 the outer sleeve into a sleeve mold, as described above (see discussion regarding elements 1005, 1010, and 1015, respectively). In some embodiments, the process 1100 can also include positioning 1120 the ring portion on the bat core. As described above, the ring portion can be positioned at a location that corresponds to the bat's traditional sweet spot. In some embodiments, the ring portion is slid onto the bat core from either end of the bat core. In some embodiments, one or more lengths of materials is wrapped about the circumference of the bat core at a certain location to form a ring portion. In certain embodiments, the ring portion is adhered to the bat core, such as by glue, epoxy, or tape.

In some embodiments, the process 1100 can also include positioning 1125 the sleeve mold over the bat core; injecting 1130 material between the outer shell and the bat core; placing 1135 the cap and cone on the tip portion and taper portion, respectively; and removing 1140 the bat from the mold for completion, as described above (see discussion regarding elements 1020, 1025, 1030, and 1035, respectively).

While several possible embodiments are disclosed above, embodiments of the present invention are not so limited. For instance, while several possible configurations have been disclosed (e.g., an aluminum bat with a TPU sleeve), other suitable materials and configurations could be selected without departing from the spirit of embodiments of the invention. In addition, the location and configuration used for various features of embodiments of the present invention can be varied according to a particular bat size and weight, a particular set of rules, or simply user preference. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

The invention claimed is:

1. A batting system for baseball or softball, the batting system comprising:
   a substantially stepless, rigid shell comprising a tip portion, a barrel portion, a handle taper, and a handle portion, the barrel portion and the handle portion being substantially cylindrical in shape, the handle taper connecting the barrel portion and the handle portion;

a ring portion disposed about a circumference of an external surface of the barrel portion of the rigid shell, the ring portion comprising a first material having a first density;

an exterior sleeve disposed in an overlying manner to the barrel portion, wherein the exterior sleeve comprises a self-supporting, substantially cylindrical sleeve portion disposed proximate the barrel portion that is press-fit to abut a discrete conical portion disposed proximate the handle taper; and an interior sleeve disposed between the rigid shell and the exterior sleeve, the interior sleeve comprising a second material (i)that is the same material as the first material and has a second density that is different from the first density or (ii) that is a different material from the first material and has a second density that is greater than or approximately equal to the first density, wherein the interior sleeve directly abuts both the rigid shell and the rigid, substantially cylindrical sleeve portion, and the interior sleeve extends from the conical portion to the tip portion.

2. The batting system of claim 1, wherein the ring portion is disposed at a position along the barrel portion that corresponds to a traditional sweet spot of the batting system.

3. The batting system of claim 2, wherein the ring portion is centered at a location approximately 6 inches from an end of the batting system proximate the tip portion.

4. The batting system of claim 2, wherein the batting system has an effective sweet spot, the effective sweet spot being larger than the traditional sweet spot.

5. The batting system of claim 2, wherein the ring portion is approximately 3 inches wide.

6. The batting system of claim 1, wherein at least some of the interior sleeve is disposed between the ring portion and the exterior sleeve.

7. The batting system of claim 2, wherein the ring portion locally decreases a coefficient of restitution of the batting system.

8. The batting system of claim 1, wherein the interior sleeve attaches directly to each of the exterior sleeve, the ring portion, and the substantially stepless, rigid shell such that the exterior sleeve, the interior sleeve, the ring portion, and the substantially stepless, rigid shell form a unitary object.

9. The batting system of claim 1, wherein a portion of the interior sleeve is disposed between the exterior sleeve and the ring portion.

10. A batting system for baseball or softball, the batting system comprising:

a substantially stepless, rigid shell comprising a cap end, a barrel portion, a handle taper, and a handle portion, the barrel portion and the handle portion being substantially cylindrical in shape, the handle taper connecting the barrel portion and the handle portion; and a sleeve assembly disposed in an overlying manner to the barrel portion, the sleeve assembly comprising:

an outer sleeve concentrically disposed about the barrel portion, the outer sleeve (i) being self-supporting and substantially cylindrical and (ii) having a first end proximate the tip portion and a second end proximate the handle taper;

a conical portion abutting at least a portion of the handle taper and at least a portion of the second end of the outer sleeve;

a ring portion disposed about a circumference of an external surface of the barrel portion, the ring portion (i) abutting the barrel portion and (ii) comprising a first material;

an inner sleeve disposed between at least some of the sleeve portion and at least some of the rigid shell, the inner sleeve having a non-plied construction and comprising a second material, wherein the first material is a relatively low-performance material as compared to the second material.

11. The batting system of claim 10, wherein a second material is a cured injectable material disposed between at least some of the sleeve portion and at least some of the rigid shell.

12. The batting system of claim 11, wherein the second material comprises polyurethane foam.

13. The batting system of claim 10, wherein at least some of the inner sleeve is disposed between the ring portion and the outer sleeve.

14. The batting system of claim 10 further comprising a cap disposed proximate the cap end of the rigid shell, the cap affixed to at least one of the rigid shell, the inner sleeve, and the outer sleeve.

15. The batting system of claim 14, wherein at least one of the cap, the inner sleeve, the ring portion, and the conical portion prevents the outer sleeve from contacting the rigid shell.

* * * * *